(12) United States Patent
Shin et al.

(10) Patent No.: US 7,155,745 B1
(45) Date of Patent: Dec. 26, 2006

(54) DATA STORAGE DEVICE PROVIDED WITH FUNCTION FOR USER'S ACCESS RIGHT

(75) Inventors: Kil-ho Shin, Nakai-machi (JP); Yuzuru Fukuda, Nakai-machi (JP); Hironori Gotoh, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1076 days.

(21) Appl. No.: 09/656,315

(22) Filed: Sep. 6, 2000

(30) Foreign Application Priority Data

Oct. 15, 1999 (JP) ................................ 11-293752

(51) Int. Cl.
G06F 7/04 (2006.01)
G06F 17/30 (2006.01)
G06F 15/16 (2006.01)
G06K 9/00 (2006.01)
H04L 9/00 (2006.01)
H04K 1/00 (2006.01)

(52) U.S. Cl. .................... 726/27; 713/167; 713/182; 709/229

(58) Field of Classification Search ............... 713/159, 713/165, 168, 170, 184, 200, 167, 182; 380/25; 707/9, 200; 726/27; 709/229
See application file for complete search history.

(56) References Cited

U.S. PATENT DOCUMENTS

| 4,860,351 | A | | 8/1989 | Weingart ................... 713/194 |
| 5,103,392 | A | | 4/1992 | Mori ........................... 705/53 |
| 5,117,457 | A | | 5/1992 | Comerford et al. ......... 713/194 |
| 5,144,556 | A | * | 9/1992 | Wang et al. ..................... 707/9 |
| 5,297,278 | A | * | 3/1994 | Wang et al. ................. 707/200 |
| 5,987,134 | A | * | 11/1999 | Shin et al. .................. 713/159 |
| 6,073,234 | A | | 6/2000 | Kigo et al. .................. 713/161 |
| 6,088,802 | A | * | 7/2000 | Bialick et al. .............. 713/200 |
| 6,108,420 | A | * | 8/2000 | Larose et al. ................. 705/59 |
| 6,185,681 | B1 | * | 2/2001 | Zizzi ........................... 713/165 |
| 6,516,413 | B1 | * | 2/2003 | Aratani et al. .............. 713/170 |
| 6,567,915 | B1 | * | 5/2003 | Guthery ....................... 713/168 |
| 6,615,352 | B1 | * | 9/2003 | Terao et al. ................. 713/184 |
| 6,651,167 | B1 | | 11/2003 | Terao et al. ................. 713/168 |
| 6,718,470 | B1 | * | 4/2004 | Adams ........................ 713/201 |

FOREIGN PATENT DOCUMENTS

| JP | 63-124153 | 5/1988 |
| JP | 63-124155 | 5/1988 |
| JP | 3-100753 | 4/1991 |
| JP | 06-95320 | 4/1994 |
| JP | A 10-247905 | 9/1998 |

\* cited by examiner

*Primary Examiner*—Ayaz Sheikh
*Assistant Examiner*—Christian LaForgia
(74) *Attorney, Agent, or Firm*—Oliff & Berridge, PLC

(57) ABSTRACT

An application of a client includes a proof data generation device, a command generation device, and a command issuing device. A command and proof data are sent to a server from the application of the client, and a command management device of the server receives them. A proof data verification device verifies the access right of a user to the application on the basis of the proof data, and enables a data storage device to be accessed in accordance with the command, if the verification is successful. The data storage device, used instead of a commonly used hard disk drive, includes a phase change type optical memory or a phase separation type optical memory to execute write once recording. Thus, the access to the data storage device is flexibly controlled.

51 Claims, 28 Drawing Sheets

DATA STORAGE DEVICE PROVIDED WITH FUNCTION FOR USER'S ACCESS RIGHT

BACKGROUND OF THE INVENTION

1. Field of the Invention

The present invention relates to a data storage device that enhances the security of the data storage device in informational space connected to a network, especially the Internet.

2. Description of the Related Art

As a conventional technique relating to the invention, the firewall and the file encryption techniques should be referred to.

The firewall technique installs a host machine called the firewall gateway at the interface between the internal network and the external network, monitors the communication coming into the internal network from the external network, and connects only a secure communication to the internal network.

On the other hand, the file encryption technique encrypts files stored in hard disks, etc., to thereby protect the data of the files. This technique prevents the confidential data from being read, against internal attacks as well as external attacks. Also, it prevents the data stored in the memories from being destroyed or tampered with.

First of all, the problems of the firewall technique will be discussed.

The Internet materializes the ideal of informational environment connecting anyone at any place, at anytime, which is remarkably spreading. It is conceived that everyone on earth will be connected to the Internet in the near future. In this space created by the Internet, called the cyber space, the reconstruction of the real world is in progress. Business is no exception. New forms of business, generally called the cyber business, are being created one after another. As the cyber space is increasingly used, various problems thereof are starting to draw attention. There are two major problems: the first one is the compatibility of the free use of information with the management of the rights, and the second one is the compatibility of the free use of information with the security. The first one relates to the copyrights and the rights to intellectual properties, the problem as to how these confronting problems should be treated. To this problem, Ryoichi Mori, a former professor at University of Tsukuba, has proposed the theory of "super distribution" (Japanese Published Examined Patent Application No. Hei 6-95302), and many manufacturers and organizations are following this theory, examining it in practice, and gradually starting to adopt it. The second problem relates to the security (privacy, authenticity, preservation) of information. This directly concerns the securing of safety against destruction, tapping, and tampering of data by the third party.

There are two major threats to the security of information in the cyber space where the Internet plays a major role. The first is the attacks (an illegitimate accesses) by people inside the network, usually called "the enemy within the gate". Here, the people inside the network signifies the users within the network, including the system managers and system organizers. It has been said from the past record that most of the computer crimes are internal. The statistics of the police department shows the figure of 69%, and this fact is endorsed by the recent cases. The second is the intruders from the outside of the network, so-called third parties including criminals, crackers, spies, industrial spies, terrorists, etc. These intrusions occur, because the Internet is connected to unspecified numbers of people and is an information system with high anonymity, unlike the network that used to have a certain limitation. This is why the Internet is quoted as a lawless area without borders. As countermeasures against the threats by the third parties, the encryption technique for protecting the transaction from being tapped, and the firewall technique for preventing the intrusion into the network have become significant.

To the internal network are connected various host computers, each of which implements various processes. So the purpose and level of the security required differ depending on each host. However, since the firewall technique implements intensive security at the firewall gateway, it is impossible to implement tight security based on the processing contents of the host computers connected to the internal network and the contexts of the communication. Therefore, dangerous communications are eliminated with a protocol level of rough information such as IP addresses and port numbers as the only clue. For this reason, dangerous communications to specific hosts can pass through the supervision of the firewall into the internal network.

Also, the firewall has a merit of avoiding drop-outs and leakage by making every communication pass through a specific firewall gateway; however viewing this in reverse, this means that if the gateway machine is intruded, there will not be any other technique to guarantee security.

Using the encryption technique can partially compensate for the above mentioned flaws of the firewall. In other words, the encryption and key management of the file become possible so as to match the form in which each host is used. And, even if the firewall gateway is intruded, the contents of the file can be protected at the host level.

However, the file encryption technique is effective to attack of reading the contents of the file, and it cannot be a measure for attacks intended to destroy the file itself. Actually, an attack attempting to destroy the file can be made by far easier than an attack trying to read the file, and a damage by a successful attack is extremely serious.

Whether it is an enemy within the gate or an external third party, the direct attack is made to the information file stored in the memory/memory unit of a personal computer or a work station. The purpose of the attack is to destroy, tamper with, and tap the file. A major countermeasure for tapping is to encrypt the information. Therefore, in order to tap, the criminal will have to decipher the cipher, which is not so easy. But tampering and destruction do not always require decryption of the cipher, and simple rewriting or erasing of the information will suffice for tampering and destruction. They are much easier to do, and damage is more significant. Also, intruders to the memory/memory unit are always logged. But it is a basic rule for crackers and hackers to erase their logs, so they log off without leaving any trace of their intrusion.

One major cause enabling this logging off without leaving a trace is attributed to the capability of rewriting the information by the hard disk drive using a magnetic recording medium, which is currently the core of the memory/storage technique. In the real world, information is written on papers, and if it is to be tampered with or erased, there will be some kind of a trace, which has given a suppressive force to these attacks. But in the era of the Internet, since unspecified numbers of people are connected to the network, yet the level of anonymity is high, and the proof of these illicit actions can be erased, these illegal acts such as destruction and tampering are induced and encouraged.

SUMMARY OF THE INVENTION

The invention has been made in view of the aforementioned circumstances, and provides effective protection technique against not only attacks of reading the files stored in the storage media in the host computers, but attacks of destroying and/or tampering with the files.

The basic technique of the invention has two phases. The first phase is to preventing illicit accesses from the outside. This will be done by the authentication section for the accesses from the outside. The second phase is to those that have passed through the first phase, and also to attacks such as tampering and destruction by insiders. This will be achieved by a storage media that make it physically impossible to destroy or tamper with information. In other words, the authentication section will be provided in the lower layer of the application, thus increasing the capability of obstructing the breakers of the authentication section compared to the existing one, and at the same time, further providing a complete measure for preventing destruction and tampering, even if the strengthened authentication section is broken.

The first phase, the method of preventing the attack by the authentication section against access from the outside, will be explained.

The application program (programs that operate on the host) in the storage media to be accessed sends a command to request an access to the data storage device provided with a function for authenticating user's access right. The data storage device provided with a function for authenticating user's access right verifies the proof data generated by the application program using the user unique identifying information and the auxiliary proof data of the application program, and only when the verification is successful, accepts the access command, and issues the command to the data storage device.

As mentioned above, the data access to the storage device is permitted only when the access right is authenticated, which makes it possible to securely protect the data in the data storage device from illicit accesses. The security by this scheme can be programmed fine for each application program (user) with the auxiliary proof information. The configuration of this invention has much more flexibility in security than the conventional firewall based on the port numbers and request originator's address information. However naturally, to use the security scheme of the invention combined with that of the conventional in parallel is also effective.

Next, the second phase will be explained. The second phase is to prevent attacks such as destruction and tampering by illicit accesses that have passed through the first phase and by illicit accesses from insiders. This will be achieved by the storage medium that is physically impossible to destroy or tamper with information. Currently, most of data storage depends on the hard disk drive (hereinafter called HDD). The HDD is a rewritable storage using a magnetic storage medium located in the lower layer to the cache memory of the personal computer/workstation. It is often used as the so-called working memory. When a user frequently modifies or changes the data, while creating or editing the data on the personal computer/workstation, this rewritability is an important factor. From the security point of view, however, this rewritability is a big problem and a weakness for safety, when recording and archiving an important information. For a person well informed of systems from the outside or a malicious inside system administrator, for example, it is very easy to tamper with or destroy a file without leaving any evidence. In such a crime, even the log data can be tampered with, which makes it extremely difficult to recognize the crime itself. To make things clear, for those making these illicit accesses, the object of attack is the memory/memory unit, the very HDD.

Generally, privacy, authenticity, and availability are given as the three elements of the information security. And, when analyzing the memory/memory unit as to the three elements, there are two elements deduced, which are the originality and the network fitness. And, further breaking down these two into more concrete elements leads to the impossibility of tampering and the life of an original as to the originality, and the transfer rate and the large-capacity as to the network fitness. The impossibility of tampering means being impossible of rewriting. With regard to the life of an original, more than the equivalent level to the life of a cipher is considered necessary. Accordingly, it is considered that the life of an original is desired more than 20 years (meaning the time for the cipher becoming obsolete). As for the transfer rate, more than the equivalent level to the ordinary HDD is desired. However, this is not essential, and it is set timely depending on the quantity and quality of the information being handled. As for the large-capacity, more than the equivalent level to the ordinary HDD is desired.

Among all kinds of storage widely known at present, the one that is the closest to the requirements given above is the write once optical storage.

The write once optical storage is still unsatisfactory in some points except for the impossibility of tampering, but there are possibilities of improvement in the future. Compared to this, there is no possibility for other storages to realize the impossibility of tampering at the present and in the future. To be precise, this write once optical storage includes the CD-R (Compact Disk Recordable), DVD-R (Digital Versatile Disk Recordable), and WO (Write-Once) type that was standardized in the ISO (International Organization for Standardization). The capacity of the storage is needed to meet the capacity that the system to be adopted needs. This does not necessarily have to be satisfied with only one disk. Rather, in terms of a library, by leaving the possibility for supplying the media as needed, a more flexible system can be organized. However, since the optical disk itself is commutative to be easily replaced physically from the library and the drive, it should be managed from the security point of view. In other words, it is necessary to build a system such that the personnel who can physically approach the media is limited, and when the personnel has to handle the media, the action has to be authorized by plural persons. Naturally, the library necessarily provides for a hand-over mechanism of the disk media between the storage of the media and the drive thereof. The hand-over time, the time for actually starting the operation after the disk is mounted on the drive, and the access time of the head should be as shorter as possible. After the head accesses the disk, preferably the actual data transfer rate can follow the speed of the network. In this regard, the speed has to be as fast as the HDD. At present, the recording speed of about 10 Mbps is barely implemented. But in the future, there is a possibility that the transfer speed will be improved significantly by the multi-beam head. As for the life of an original, normally, the life of the write once optical disk is guaranteed up to more than 10 years as a product. Therefore in general, it is necessary to secure more than 10 years of life additionally. There are many kinds of materials for the write once optical disk, but as a principle, they can be classified into the perforation system, phase transformation system, and alloyed reaction system. In the phase transformation system, there are the phase change system between the crystal and the amorphous, and the phase separation system that utilizes the separation of phase. In this invention, as long as the above-mentioned requirements are met, any one of these can be utilized.

The invention enables the trace of tampering as a proof to remain by using the write once storage medium, so that it will be possible to effectively cope with the tampering, etc.

The invention will be explained further.

In accordance with one aspect of the invention, the data storage device provided with a function for authenticating a user's access right, which verifies legitimacy of proof data generated for proving the user's access right to data by an application program, stored in a storage medium, to thereby authenticate the user's access right to the application program, is provided with: a first storage section for storing authentication data; a second storage section for storing user unique identifying information of the application program; a third storage section for storing auxiliary proof information being a result in which a specific calculation is executed to the user unique identifying information of the application program and unique security characteristic information; a proof data generation section for executing a specific calculation to the authentication data stored in the first storage section, the user unique identifying information of the application program stored in the second storage section, and the auxiliary proof information stored in the third storage section, to thereby generate proof data; a data storage main frame provided with a storage medium, which stores and preserves data in the storage medium; a command generation section installed in the application program, for generating a command that instructs an operation to the data stored in the storage medium of the data storage main frame; a command issuing section installed in the application program, for issuing a command generated by the command generation section to the outside of the application program; a proof data verification section for verifying the proof data generated by the proof data generation section to be generated on the basis of the unique security characteristic information; and a command management section for permitting to execute the command only when the verification is successful, as to at least one type of the command that instructs the operation to the data stored in the data storage main frame.

In this configuration, authentication can be implemented for each application program and illicit access to the data in the data storage device can be avoided. The application program and the data storage device can be connected to each other via a network (LAN, WAN, Internet, etc.), or, it could also be configured that both the application program and the data storage device exist in the stand-alone computer.

Also, the operation of the data in the foregoing data storage device is read/rewrite/delete, and at least one type of command is a read or a delete command.

In accordance with another aspect of the invention, the data storage device provided with a function for authenticating a user's access right, which verifies legitimacy of proof data generated for proving the user's access right to data by an application program, stored in a storage medium, to thereby authenticate the user's access right to the application program is provided with: a first storage section for storing authentication data; a second storage section for storing user unique identifying information of the application program; a third storage section for storing auxiliary proof information being a result in which a specific calculation is executed to the user unique identifying information of the application program and unique security characteristic information; a proof data generation section for executing a specific calculation to the authentication data stored in the first section and the user unique identifying information of the application program stored in the second storage section, to thereby generate proof data; a data storage main frame provided with a storage medium, which stores and preserves data in the storage medium; a command generation section installed in the application program, for generating a command that instructs an operation to the data stored in the storage medium of the data storage main frame; a command issuing section installed in the application program, for issuing a command generated by the command generation section to the outside of the application program; a proof data verification section including a calculation section for applying a specific calculation to the proof data generated by the proof data generation section and the auxiliary proof information held in the third storage section, which verifies the proof data to be generated on the basis of the user unique identifying information of the application program, by using a calculation result by the calculation section; and a command management section for permitting to execute the command only when the verification is successful, as to at least one type of the command that instructs the operation to the data stored in the data storage main frame.

This configuration also implements the authentication for each application program, and avoids illicit access to the data in the data storage device. Also, in this configuration, when the application program accesses the data storage device, it sends the auxiliary authentication information and needs to implement a calculation using this auxiliary authentication information during verification.

Further, in accordance with another aspect of the invention, the storage medium of the data storage device mentioned above is the write once optical storage medium.

In this configuration, the tampering of the data can be recognized, and an appropriate measure can be taken against the tampering of the data, etc.

In this configuration, the write once optical storage medium employs, for example, the phase change or phase separation system.

Also, of the storage media of the data storage device, the one that records the access log can be the write once optical storage medium. In other words, the storage device can be configured with the write once storage medium and the rewritable storage medium. In this case, the device that records the access log can be configured with the write once optical storage medium.

Also, in the above explanation, the control of the access to the data storage device is done by authenticating the user's access right to the application. But this may be configured such that the authentication of the access right of each application itself controls the access to the data storage device. This application may be, for example, the JAVA (trademark of the U.S. Sun Microsystems Corp.) applet, wherein the application is implemented after being fetched from the server. Or it may be an application provided by an application server. With the configuration above, security can be implemented by managing the application. The authentication of users in the use of the application can be implemented, for example, by using a directory server.

This point will be described more specifically. That is, the data storage device provided with a function for authenticating a user's access right, which verifies legitimacy of proof data generated for proving the user's access right to data by an application program, stored in a storage medium, to thereby authenticate the user's access right to the application program, is provided with: a first storage section for storing authentication data; a second storage section for storing user unique identifying information of the application program; a third storage section for storing auxiliary proof information being a result in which a specific calculation is executed to the user unique identifying information of the application program and unique security characteristic information; a proof data generation section for executing a specific calculation to the authentication data stored in the first storage section, the user unique identifying information of the application program stored in the second storage section, and the auxiliary proof information stored in the third storage section, to thereby generate proof data; a data storage main frame provided with a storage medium, which stores and preserves data in the storage medium; a command generation section installed in the application program, for generating a command that instructs an operation to the data stored in the storage medium of the data storage main frame; a command issuing section installed in the application program, for issuing a command generated by the command generation section to the outside of the application program; a proof data verification section for verifying the proof data generated by the proof data generation section to be generated on the basis of the unique security characteristic information; and a command management section for permitting to execute the command only when the verification is successful, as to at least one type of the command that instructs the operation to the data stored in the data storage main frame.

Further, the data storage device provided with a function for authenticating a user's access right, which verifies legitimacy of proof data generated for proving the user's access right to data by an application program, stored in a storage medium, to thereby authenticate the user's access right to the application program is provided with: a first storage section for storing authentication data; a second storage section for storing user unique identifying information of the application program; a third storage section for storing auxiliary proof information being a result in which a specific calculation is executed to the user unique identifying information of the application program and unique security characteristic information; a proof data generation section for executing a specific calculation to the authentication data stored in the first section and the user unique identifying information of the application program stored in the second storage section, to thereby generate proof data; a data storage main frame provided with a storage medium, which stores and preserves data in the storage medium; a command generation section installed in the application program, for generating a command that instructs an operation to the data stored in the storage medium of the data storage main frame; a command issuing section installed in the application program, for issuing a command generated by the command generation section to the outside of the application program; a proof data verification section including a calculation section for applying a specific calculation to the proof data generated by the proof data generation section and the auxiliary proof information held in the third storage section, which verifies the proof data to be generated on the basis of the user unique identifying information of the application program, by using a calculation result by the calculation section; and a command management section for permitting to execute the command only when the verification is successful, as to at least one type of the command that instructs the operation to the data stored in the data storage main frame.

Also, the invention can be implemented as an invention of the method. And at least a part of the invention of the method can be implemented as a computer program. Furthermore, it can also be implemented as a computer readable storage media with computer program recorded, for the use of implementing the invention of method in the computer.

BRIEF DESCRIPTION OF THE DRAWINGS

Preferred embodiments of the present invention will be described in detail based on the followings, wherein.

DETAILED DESCRIPTION OF THE PREFERRED EMBODIMENTS

First, the principal embodiment of the invention will be described. This embodiment takes on a system of the server client configuration as an example, however a single computer may configure a system to perform the same processing.

Figure 1:
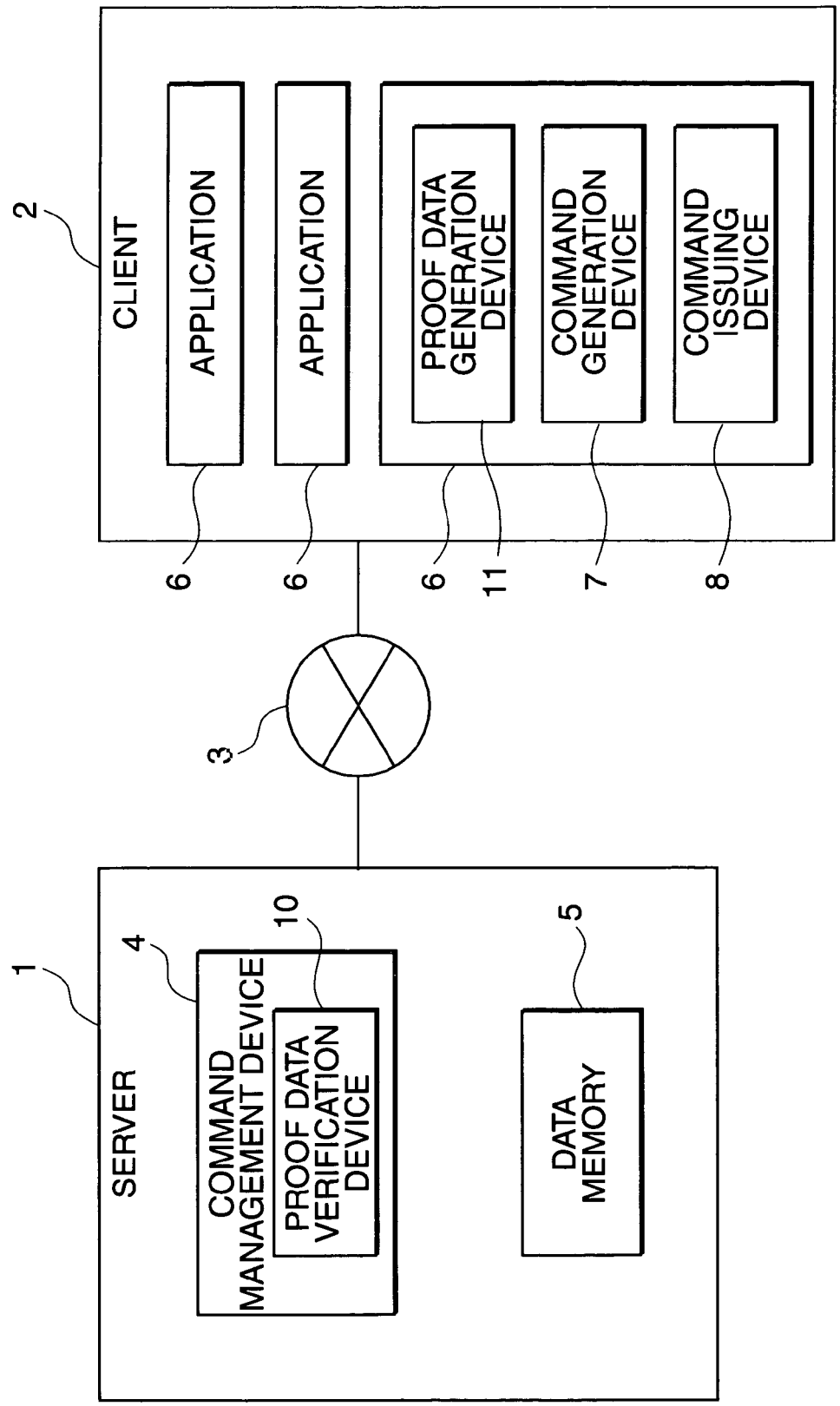
FIG. 1 is a block diagram illustrating a theoretical configuration according to the present invention.

FIG. 1 totally illustrates the server client system of this embodiment, in which a server 1 and a client 2 is connected each other through a network 3. The network 3 can be a LAN, a WAN, or the Internet. The server 1 is a database management system (DBMS) server, which includes a command management device 4 and a data memory 5. The server 1 is a PC (personal computer) server, for example, which possesses the data memory 5 as an auxiliary storage. The data memory 5 is not a hard disk drive conventionally used but a write once (WO) recording device containing a phase change type optical storage medium or a phase separation type optical storage medium. The command management device 4 includes a proof data verification device 10. The server 1 may be configured with a work station, or naturally with a general purpose large machine.

The client 2 is configured with a personal computer, for example, which executes an application 6. The application 6 contains a proof data generation device 11, a command generation device 7, and a command issuing device 8, which executes the reading, rewriting, and erasing of data in the data memory 5. The command generation device 7 generates a command for the reading, rewriting, or erasing; and the command issuing device 8 issues the command to the command management device 4 of the server 1. And, the proof data generation device 11 generates a proof data, which is transmitted to the command management device 4 together with the command.

Here, the command generation device 7 is stipulated to generate the command for the reading, rewriting, or erasing; however, the command generation device 7 may issue a job such as an SQL job being the source of command generation to the server 1. That is, it may be configured that the application on the client 2 sends a job and a proof data to the server 1, and the server 1 generates the command from the job.

In this configuration, a command and proof data are sent to the server 1 from the application 6 of the client 2, which are received by the command management device 4, the user's access right of the application 6 is verified on the basis of the proof data by the proof data verification device 10, and if it is successfully verified, the access to the data memory 5 on the basis of the command will be made possible.

The proof data verification device 10 may be configured separately from the command management device 4.

Figure 2:
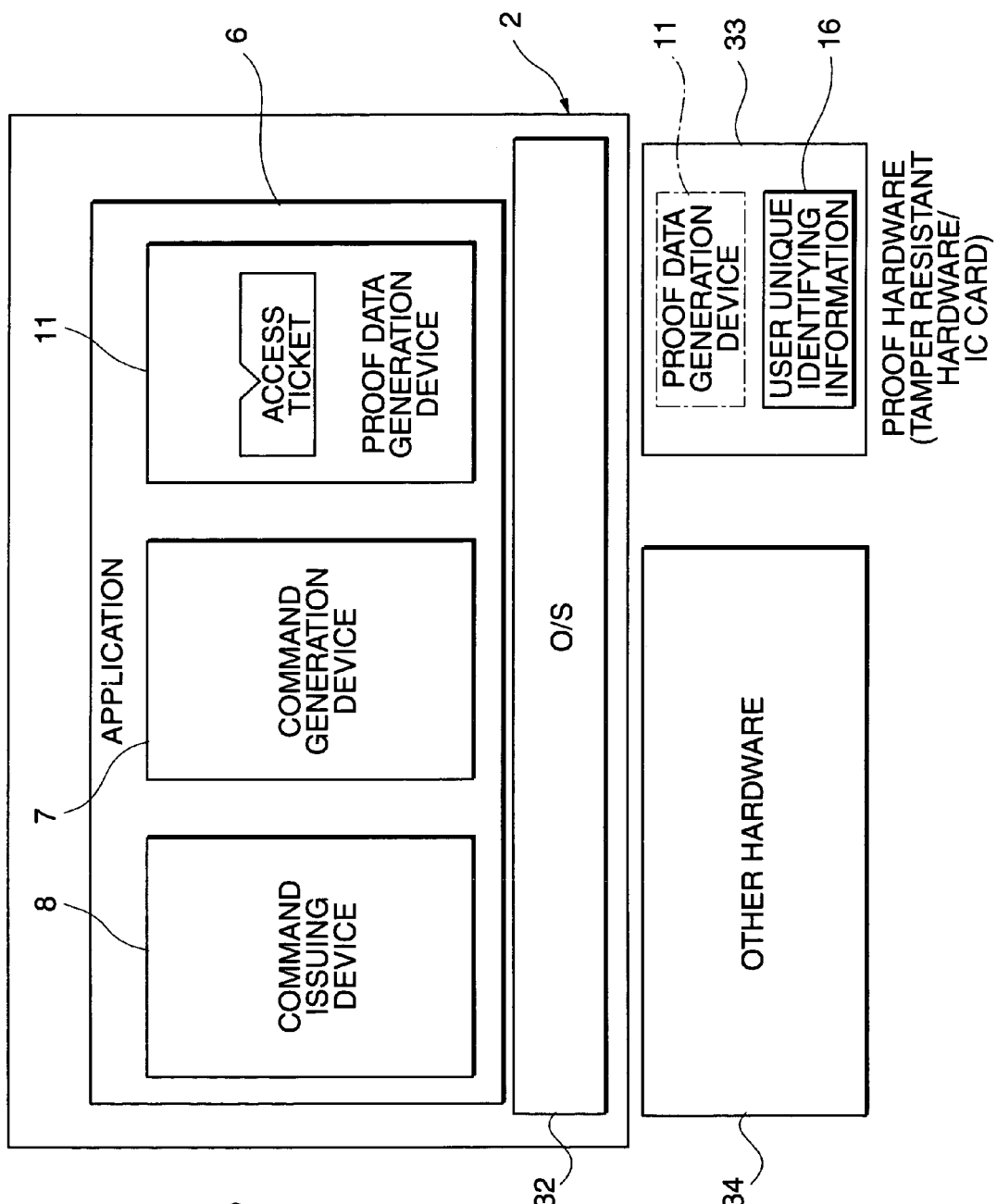
FIG. 2 is an illustration of a concrete example of a client-side device according to the above configuration.

FIG. 2 illustrates a concrete configuration of the client 2, in which the proof data generation device 11, command generation device 7, and command issuing device 8 are configured as the program module. Further, users' personal information is secured in proof hardware 33 (IC card, etc.) having the tamper resistance. The proof data generation device 11 may be incorporated into the proof hardware 33, as illustrated by the dotted line. 32 in FIG. 2 signifies a control program such as the operating system, and 34 all the other hardware.

Next, the proof data verification device 10 of the server 1 and the proof data generation device 11 of the client 2 will be described with reference to FIG. 3.

Figure 3:
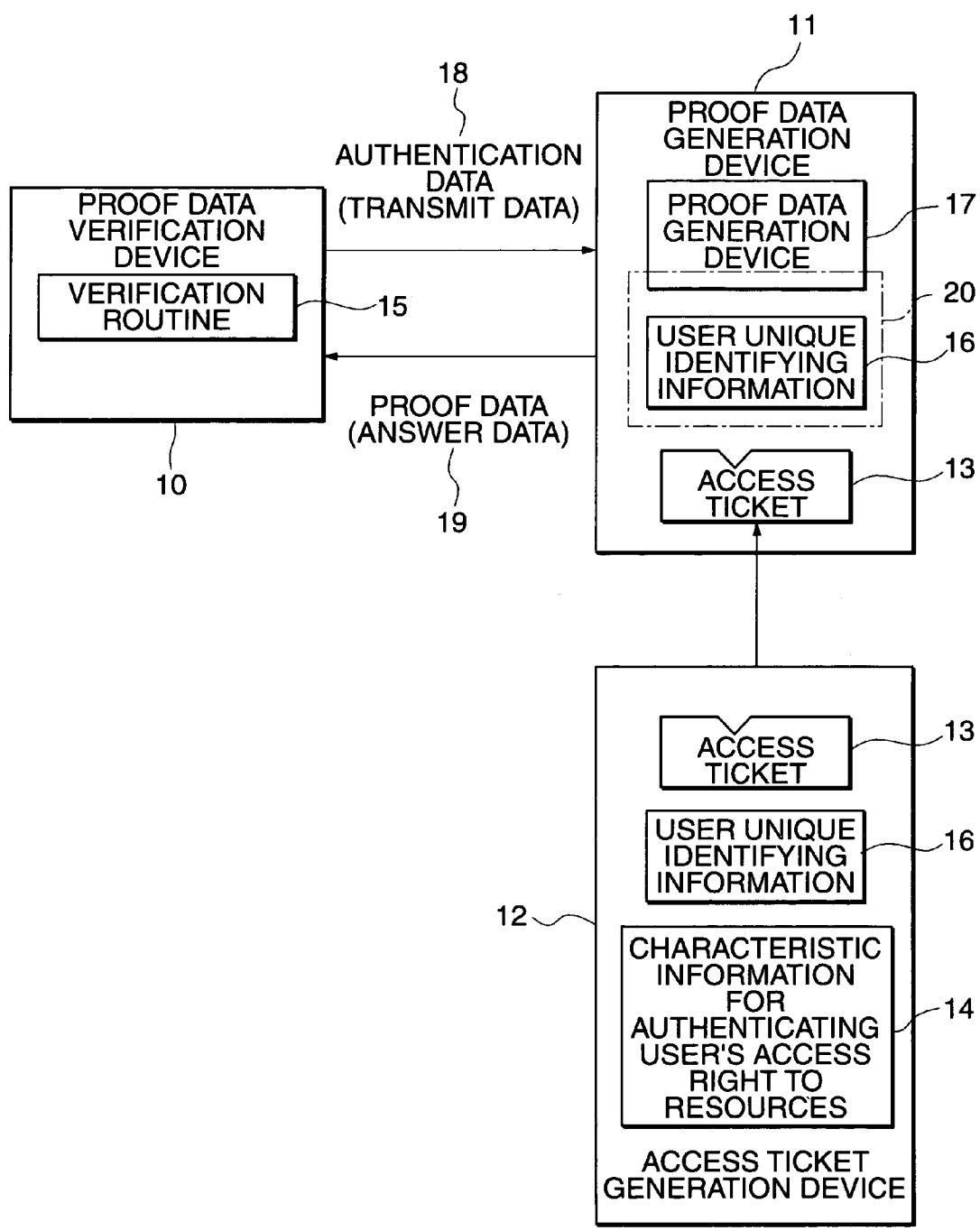
FIG. 3 is a block diagram illustrating a major part according to the above configuration.

The other components of the server 1 and the client 2, which are illustrated in FIG. 1 but not in FIG. 3, are omitted to simplify the description. The proof data generation device 11 receives an access ticket (proof support data) 13 from an access ticket generation device 12. The proof data verification device 10 executes a verification routine 15. The proof data generation device 11 holds a user unique identifying information 16 and the access ticket 13 to execute a proof data generation program 17.

The access ticket generation device 12 is owned by a manager or a reliable third party that manages the security of the data memory 5 (in FIG. 1). The access ticket generation device 12 generates the access ticket 13 on the basis of a characteristic information 14 for authenticating user's access right to resources and the user unique identifying information 16. This access ticket 13 is sent to the user through a data communication or a floppy diskette, etc., which is stored in the proof data generation device 11. Thereafter, the proof data verification device 10 transmits an authentication data 18 to the proof data generation device 11. The proof data generation device 11 generates proof data 19 by means of the access ticket 13 and the user unique identifying information 16, and answers the proof data 19 to the proof data verification device 10. The proof data verification device 10 verifies the legitimacy of the proof data on the basis of the authentication data. That is, the proof data 19 is verified to be the data generated on the basis of the authentication data 18 and the characteristic information 14 for authenticating the access right.

If the legitimacy of the proof data is verified, the user's access right will be authenticated, and the access to the data memory 5 is authorized accordingly.

As to the acquisition of the access ticket, there are two methods: a common center generates to distribute the access ticket in response to a user's request of issuing, and an application program creator individually generates the access ticket with the help of an access ticket issuing program and/or the access ticket generation device.

The access ticket generated may be delivered to the user through a portable storage medium such as a floppy disk, however in view of the sufficient security provided, it may be delivered through a network by using an electronic mail.

The security of the access ticket involves the following two properties.

The access ticket adopts the inscription system. In other words, only the user himself (or herself) to whom the access ticket has been issued (to be precise, the holder of the user unique identifying information used at the time of the access ticket being generated) is able to correctly operate the proof data generation device with the access ticket. Accordingly, even if a malicious third party taps a network to illegitimately acquire an access ticket of another user, unless this third party acquires the user unique identifying information of the legitimate user to whom the access ticket is issued, the third party cannot use this access ticket.

The access ticket holds a still rigorous security. That is, even if a malicious third party collects any number of access tickets and tries any analysis whatsoever, the third party is unable to counterfeit another access ticket based on acquired information, or to configure a device that materializes authentication by imitating the operation of the proof data generation device.

Next, a still more configuration will be described in accordance with the preferred embodiments.

First Embodiment

In the first embodiment of the invention, the access ticket t is the data generated on the basis of the following mathematical expression 1.

$$t = D - e + \omega \cdot \phi(n) \quad (1)$$

The symbols in the above expression signify the following.

n signifies an RSA modulus, namely, a product of sufficiently large two prime numbers p, q (n=p·q).

$\phi(n)$ signifies the Eulerian number of n, namely, a product of p−1 and q−1 ($\phi(n)=(p-1)\cdot(q-1)$)

The user unique identifying information e is a number different by each user, which is used to identify a user.

D signifies the access ticket private key, the RSA private key modulo n, which satisfies the expression 2.

$$\gcd(D, \phi(n)) = 1 \quad (2)$$

Here, gcd(x, y) denotes the greatest common divisor of the two numbers x, y. The character expressed by the expression (2) ensures that there exists a number E satisfying the expression (3).

$$E \cdot D \cdot \mathrm{mod}\phi(n) = 1 \quad (3)$$

The number E is called the access ticket public key.

$\omega$ is the number that is decided depending on n and e. In case where either one of n and e is different, $\omega$ is decided such that the values are not easy to coincide. As an example of the method to decide $\omega$, one-way hash function h is used to decide $\omega$, as in the following expression (4).

$$\omega = h(n|e) \quad (4)$$

Here, the symbol | represents the junction of bit strings.

The one-way hash function is a function having the character that the calculation of different numbers x, y to meet h(x)=h(y) is extremely difficult. And, as an example of the one-way hash function, there are MD2, MD4, MD5 by the RSA Data Security Inc., and the SHS (Secure Hash Standard) by the Federal Government of the U.S.

Figure 4:
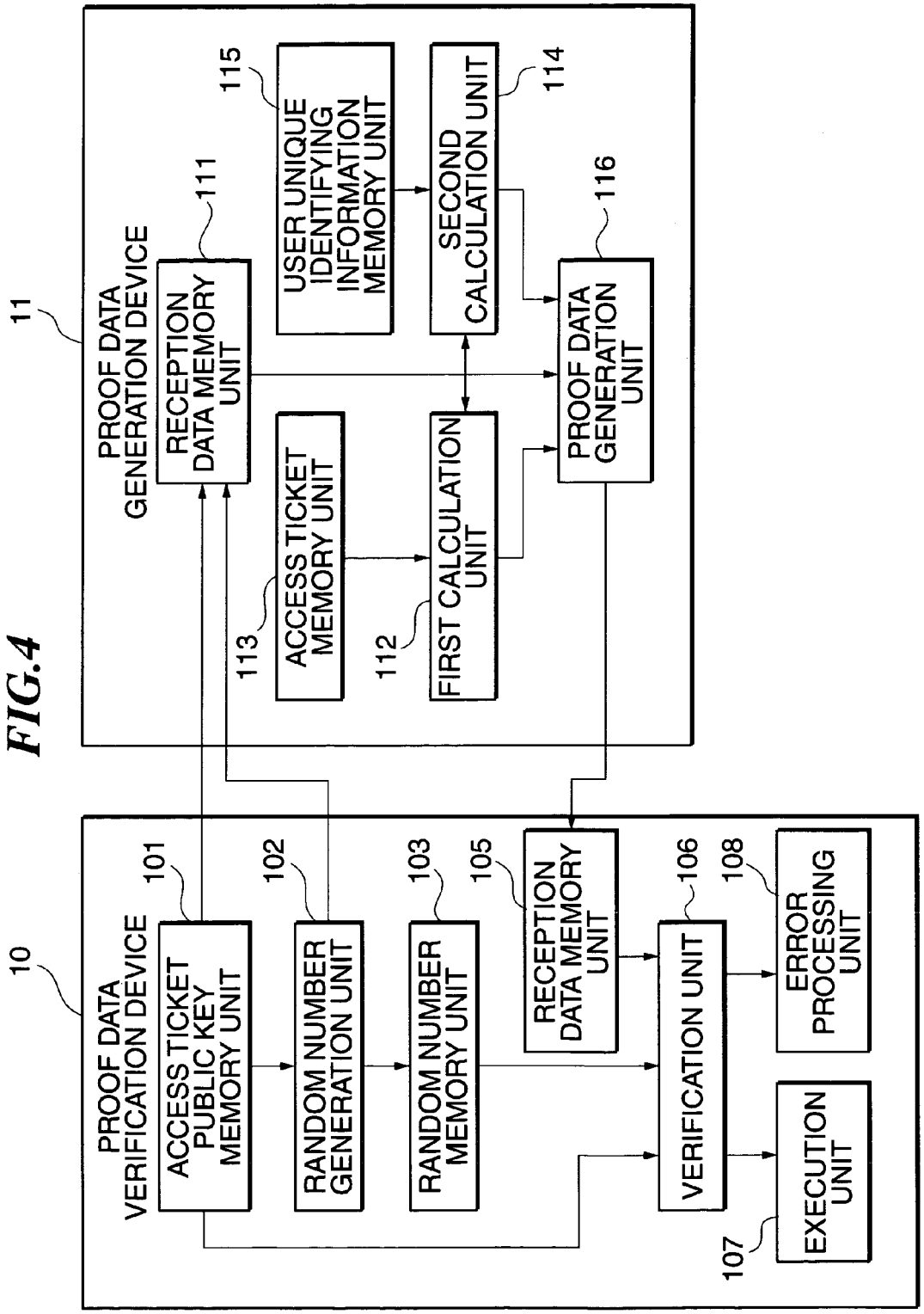
FIG. 4 is a block diagram illustrating the configuration of a proof data verification device and a proof data generation device according to the first embodiment.
Figure 5:
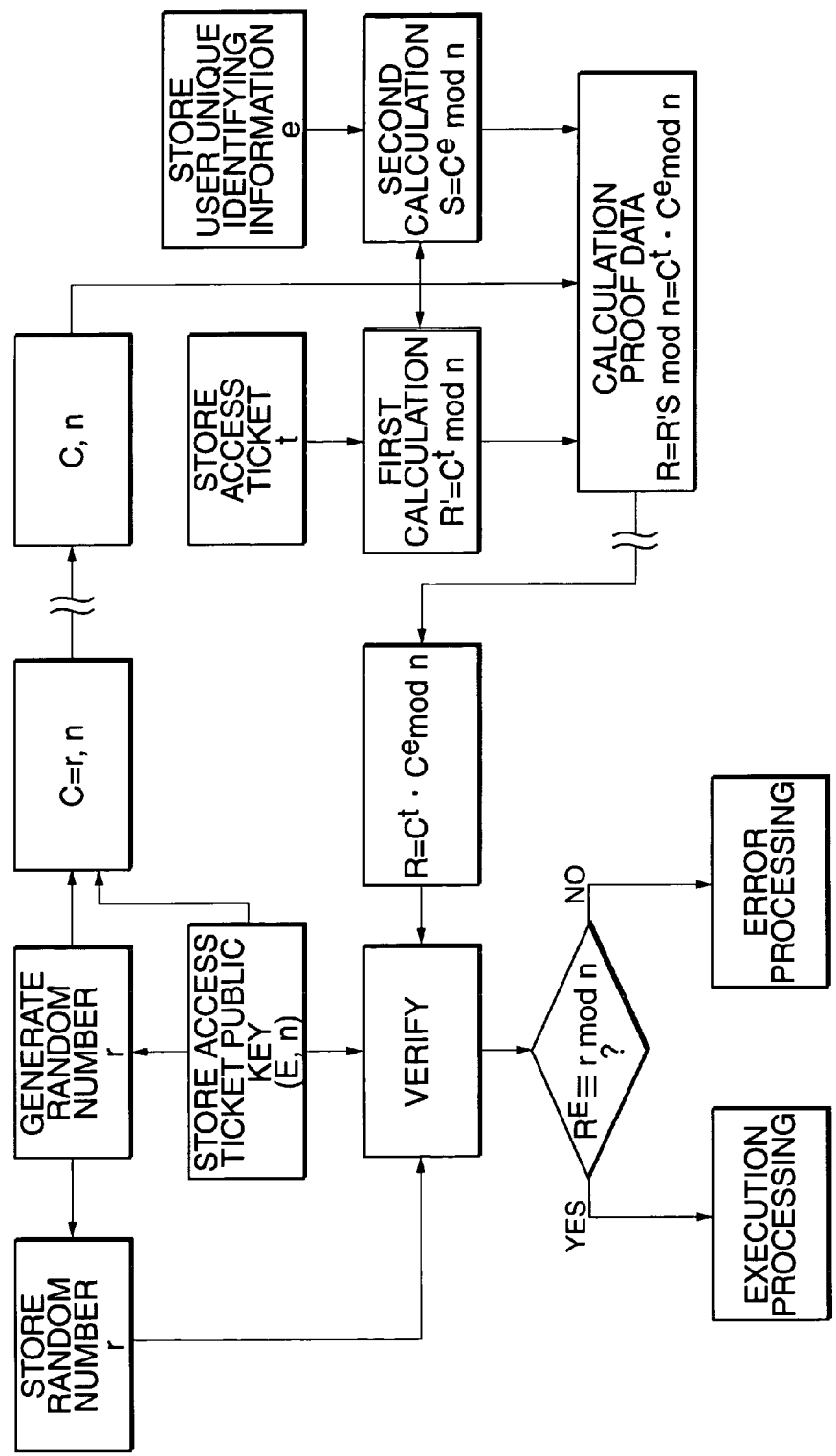
FIG. 5 is a flowchart illustrating the operation of the first embodiment.

With regard to the numbers appeared in the above explanation, t, E, n can be made open, and the remaining numbers D, e, $\omega$, p, q, $\phi(n)$ are necessary to be made private to those except for the person having the right to make the ticket. Referring to the accompanying drawings, the first embodiment will be described further in detail. FIG. 4 illustrates the configuration of the first embodiment relating to the invention, and FIG. 5 shows the flow of the data in FIG. 4. In FIG. 4, the proof data verification device 10 includes an access ticket public key memory unit 101, a random number generation unit 102, a random number memory unit 103, a reception data memory unit 105, a verification unit 106, an execution unit 107, and an error processing unit 108. And, the proof data generation device 11 includes a reception data memory unit 111, a first calculation unit 112, an access ticket memory unit 113, a second calculation unit 114, and a user unique identifying information memory unit 115, and a proof data generation unit 116. The execution unit 107 executes the command of data access.

The operation of this configuration will be explained next.

1. The proof data verification device 10 is started by an access of a user. That is, as the command generation device 7 of the application 6 generates a command for data access, the command issuing device 8 issues the command to the command management device 4 of the server 1. This command issuing prompts to start the proof data verification device 10.

2. The proof data verification device 10 writes authentication data C and the modulus n of the RSA cipher stored in the access ticket public key memory unit 101 in the reception data memory unit 111 of the proof data generation device 11. And, this authentication data C is generated by the following method.

A random number r is generated to be prime to the modulus n of the RSA cipher stored in the access ticket public key memory unit 101 by the random number generation unit 102 of the proof data verification device 10, which is recorded in the random number memory unit 103. Further, this random number r is assumed as the authentication data C. As will be described later, the proof data answered by the proof data generation device 11 is what C is encrypted under the modulus n by using the RSA cipher.

The value of C is the random number r itself, and accordingly the value is made different at each time of communications, which leads to an effect to prevent replay attacks.

3. The first calculation unit 112 of the proof data generation device 11 acquires the access ticket t stored in the access ticket memory unit 113, and calculates the expression 5 to acquire intermediate information R' under the RSA modulus n written in the reception data memory unit 111.

$$R' = C^t \bmod n \quad (5)$$

4. The second calculation unit 114 of the proof data generation device 11 acquires the user unique identifying information e stored in the user unique identifying information memory unit 115, and calculates the expression 6 to acquire a difference information S.

$$S = C^e \bmod n \quad (6)$$

5. The proof data generation unit 116 of the proof data generation device 11 acquires R' and S from the first and second calculation units 112, 114, and calculates the expression 7 to acquire R.

$$R = R'S \bmod n \quad (7)$$

6. The proof data generation device 11 answers R to the reception data memory unit 105 of the proof data verification device 10.

7. The verification unit 106 of the proof data verification device 10 first calculates the expression 8 based on the proof data R answered to the reception data memory unit 105, the public exponent E stored in the access ticket public key memory unit 101, and the RSA modulus n.

$$R^E \bmod n \quad (8)$$

Next, by comparing this calculation result with the random number C (=r) stored in the random number memory unit 103, the verification unit 106 verifies the expression 9 to be satisfied.

$$C \bmod n = R^E \bmod n \quad (9)$$

If the expression is satisfied, the execution unit 107 is started to execute the command processing; and if not, the error processing unit 108 is started to execute the error processing.

Second Embodiment

Figure 6:
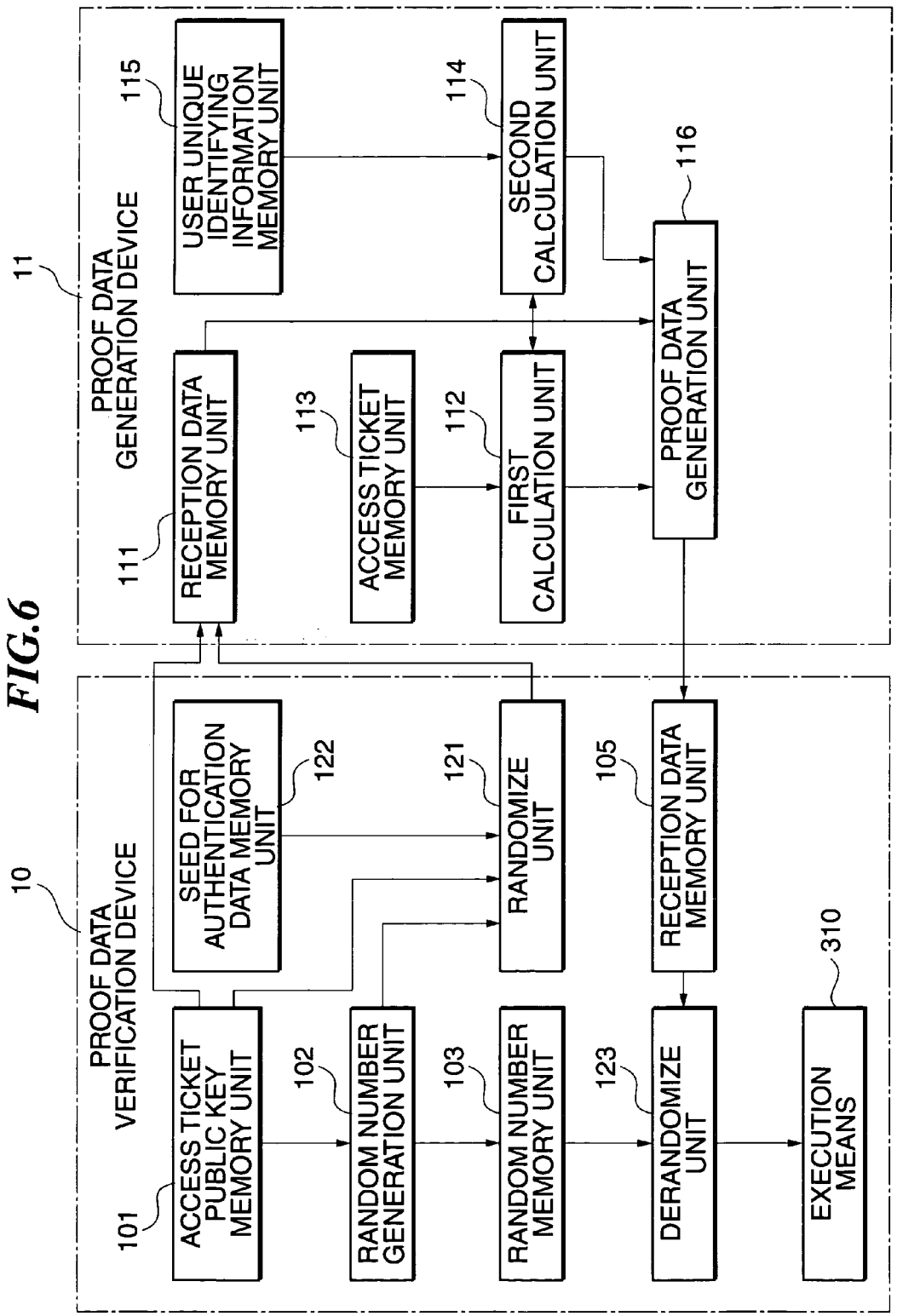
FIG. 6 is a block diagram illustrating the configuration of a proof data verification device and a proof data generation device according to the second embodiment.
Figure 7:
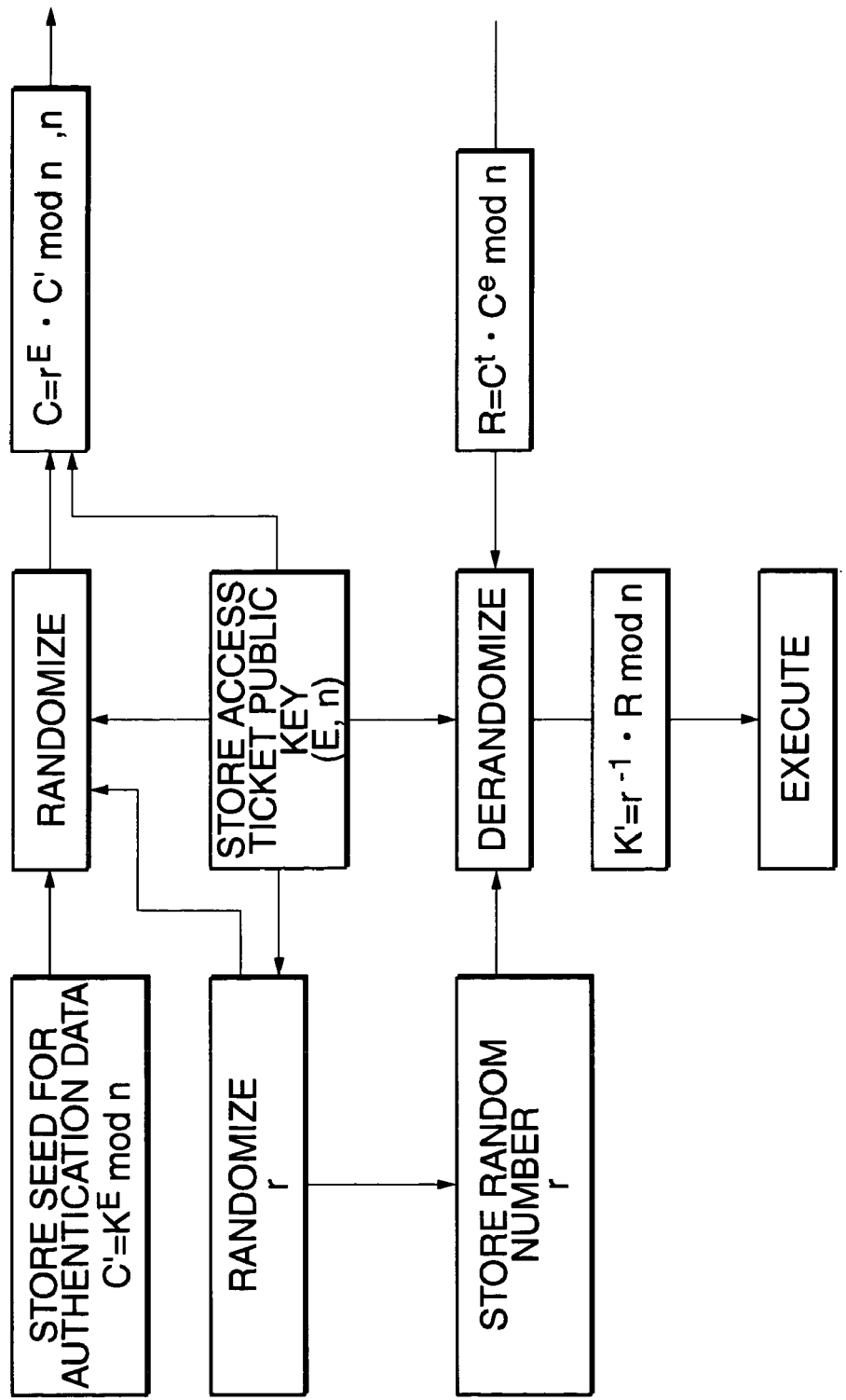
FIG. 7 is a flowchart explaining the operation of the proof data verification device according to the second embodiment.

The configuration of the access ticket t and the function of the proof data verification device in the second embodiment of the invention are the same as those in the first embodiment. In the first embodiment, the proof data is what the authentication data is encrypted, however in the second embodiment, the authentication data generated by the proof data verification device 10 is what the proof data is encrypted (accompanied with random number effect), and the proof data generation device 11 decrypts the authentication data to generate the proof data with the random number effect maintained. The second embodiment will further be explained with reference to the drawings. FIG. 6 illustrates the configuration of the second embodiment relating to the invention, and FIG. 7 illustrates the data flow in FIG. 6. In FIG. 6, the proof data verification device 10 includes the access ticket public key memory unit 101, the random number generation unit 102, the random number memory unit 103, the reception data memory unit 105, a randomize unit 121, a seed for authentication data memory unit 122, a derandomize unit 123, and an execution section 310. And, the proof data generation device 11 includes the reception data memory unit 111, the first calculation unit 112, the access ticket memory unit 113, the second calculation unit 114, and the user unique identifying information memory unit 115, and the proof data generation unit 116.

Next, the operation will be described.

1. The proof data verification device 10 is started by an access of a user. As the command issuing device 8 of the client 2 issues the command to the command management device 4 of the server 1, the proof data verification device 10 is designed to be started, which is the same as the first embodiment.

2. The proof data verification device 10 writes a pair of the authentication data C and the modulus n of the RSA cipher stored in the access ticket public key memory unit 101 into the reception data memory unit 111 of the proof data generation device 11. And, this authentication data C is generated in the following method.

The random number generation unit 102 of the proof data verification device 10 generates the random number r to be prime to the modulus n of the RSA cipher stored in the access ticket public key memory unit 101, which is recorded in the random number memory unit 103. The randomize unit 121 acquires the public exponent E stored in the access ticket public key memory unit 101 and the modulus n, and also the data C' stored in the seed for authentication data memory unit 122, and calculates the expression 10.

$$C = r^E C' \bmod n \quad (10)$$

Here, the seed for authentication data C' is generated so as to satisfy the relational expression 11 in regard to the data K, which is the value stored in the seed for authentication data memory unit 122.

$$C' = K^E \bmod n \quad (11)$$

Here, if the proof data verification device 10 is configured not to hold the data K but to hold only C' being a result of the encryption, it will avoid the risk of the data K being leaked from the proof data verification device 10.

Basically, the authentication data C is what the data K is encrypted under the modulus n by using the RSA cipher, and the proof data generation device 11 reproduces the data K by decoding the data C under the modulus n by using the RSA cipher. However, if this condition is maintained as it is, the communication between the proof data verification device 10 and the proof data generation device 11 will always be kept the same, which permits so-called replay attack. Therefore, the system is designed in such a manner that the authentication data is randomized by using the random number r, which is de-randomized when verifying the data answered by the proof data generation device 11.

3. The first calculation unit 112 of the proof data generation device 11 acquires the access ticket t stored in the access ticket memory unit 113, and calculates the expression 12 to acquire the intermediate information R' under the RSA modulus n written into the reception data memory unit 111.

$$R' = C^t \bmod n \quad (12)$$

4. The second calculation unit 114 of the proof data generation device 11 acquires the user unique identifying information e stored in the user unique identifying information memory unit 115, and calculates the expression 13 to acquire the difference information S.

$$S = C^e \bmod n \quad (13)$$

5. The proof data generation unit 116 of the proof data generation device 11 acquires R' and S from the first and second calculation units 112, 114, and calculates the expression 14 to acquire R.

$$R = R'S \bmod n \quad (14)$$

6. The proof data generation device 11 answers the data R to the reception data memory unit 105 of the proof data verification device 10.

7. The derandomize unit 123 of the proof data verification device 10 fetches the already generated random number r from the random number memory unit 103 and the proof data R from the reception data memory unit 105, and calculates the expression 15.

$$K' = r^{-1} R \bmod n \quad (15)$$

Only when the combination of the access ticket t and the user unique identifying information e which are used in the proof data generation device 11 is correct, the data K' and K acquired by the calculation become equal.

The calculated data K' is handed over to the execution section 310 of the proof data verification device 10, and the execution section 310 executes the command only when K'=K is met.

Next, several examples of the methods will be described which configure the execution section 310 of the proof data verification device 10.

Figure 8:
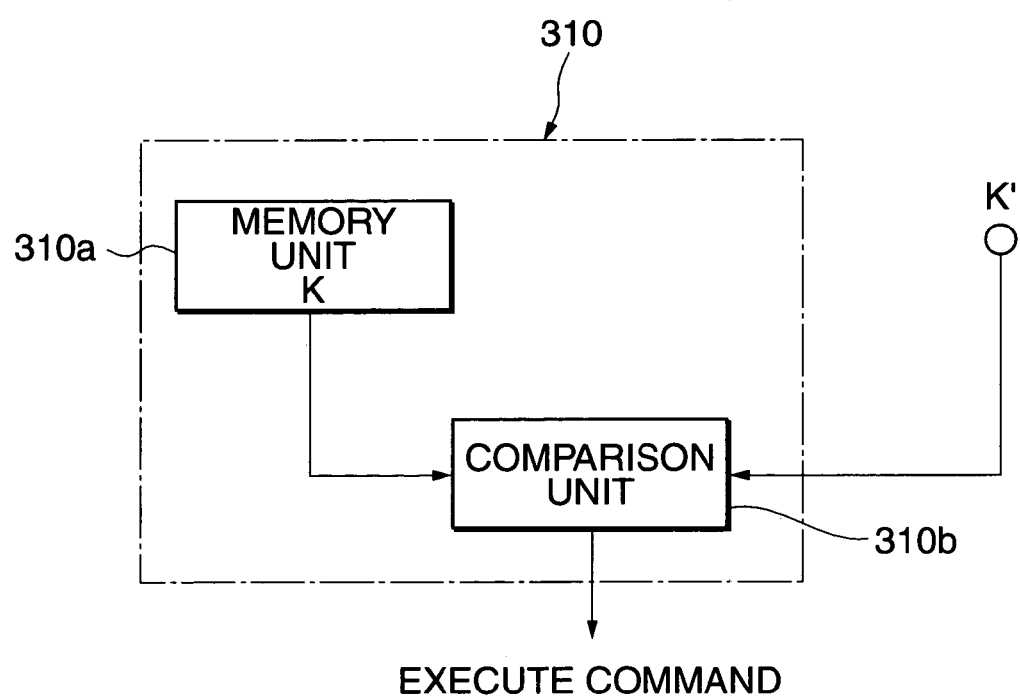
FIG. 8 is a block diagram illustrating a configuration of an execution unit of the proof data verification device according to the second embodiment.

1. Configuration Example: FIG. 8

Figure 9:
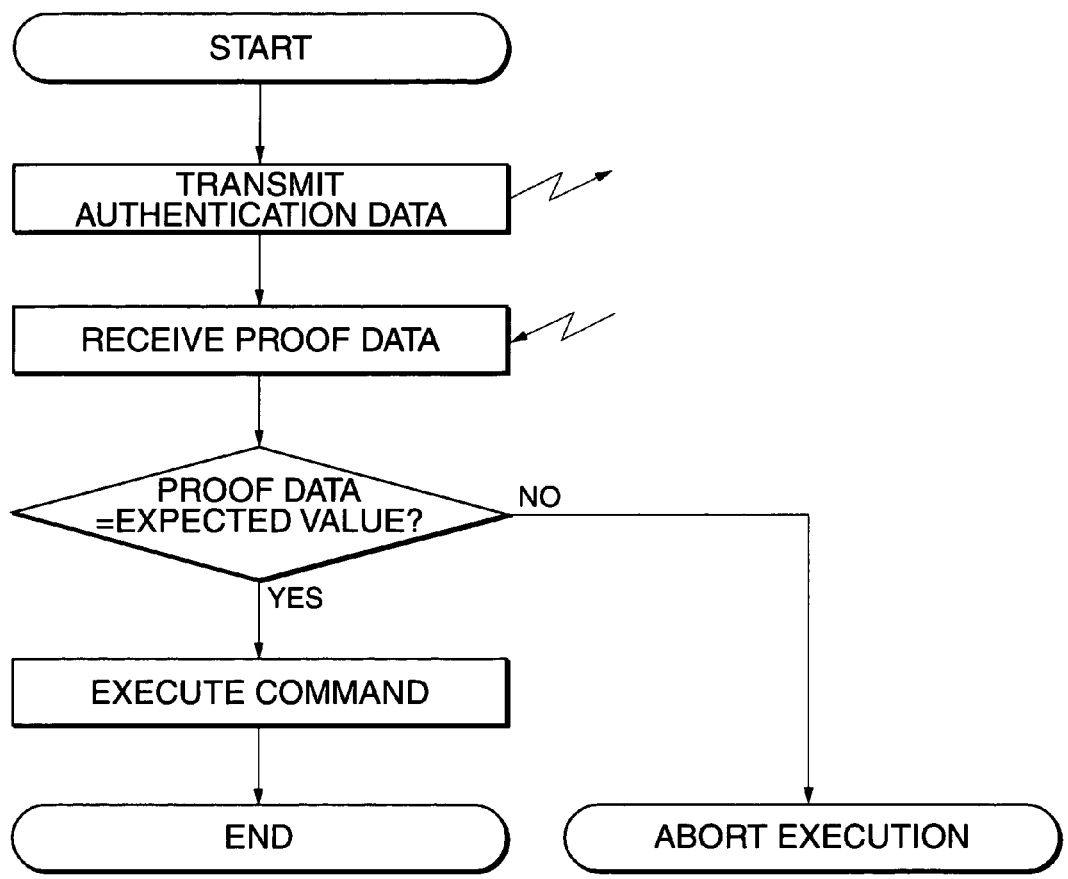
FIG. 9 is a flowchart explaining the operation of the execution unit in FIG. 8.

A memory unit 310a of the execution section 310 beforehand stores the data K. A comparison unit 310b of the execution section 310 compares this data K with the data K' obtained by removing the random number effect from the proof data R sent by the proof data generation device 11. And, only when K'=K is satisfied, the command is executed; and if not, the error processing including the abortion of processing is executed (FIG. 9).

In this configuration, there is a weak point on security that the data K for verification appears in the device. If the proof data verification device 10, especially the execution section 310 is configured as a program that operates with a user's PC or work station, it is difficult to steal the data K by analyzing the program, but it is not necessarily impossible. The user will know the value of K, and will further be able to configure a device that imitates the operation of the proof data generation device 11, if the random number generated by the proof data verification device 10 is predictable, which permits illegal access by pretension.

Figure 10:
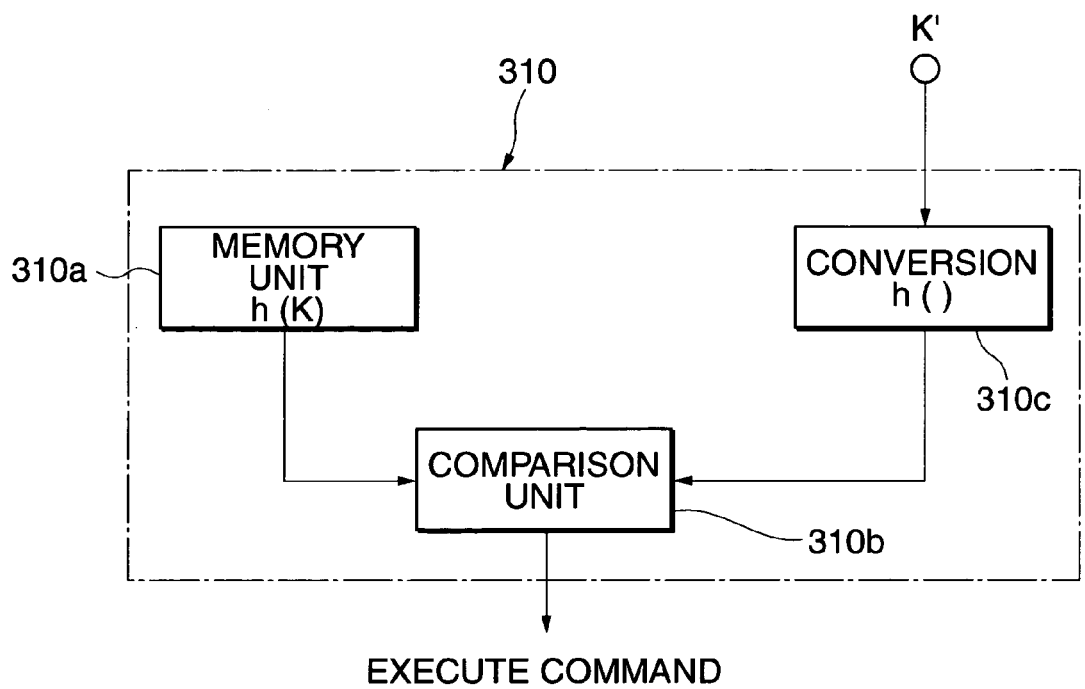
FIG. 10 is a block diagram illustrating another configuration of the execution unit of the proof data verification device according to the second embodiment.

2. Configuration Example: FIG. 10

In order to improve the aforementioned week point, it is possible that the data stored in the memory unit 310a is not K itself, but is replaced by the data h(K) acquired by applying the aforementioned one-way hash function h to the data K. Owing to the property of the one-way hash function, it is extremely difficult to calculate x to meet y=h(x) from the data y stored in the memory unit 310a.

The execution section 310 has a conversion unit 310c that answers a result with the one-way hash function applied to the input data. The comparison unit 310b compares the output h(K') of the conversion unit 310c with the data (=h(K)) stored in the memory unit 310a (FIG. 11).

In this method, the data K used for verification will not appear in the program, and it is extremely difficult to calculate K from the h(K) stored in the memory unit 310a; and this configuration is safer than the example in FIG. 8.

Figure 11:
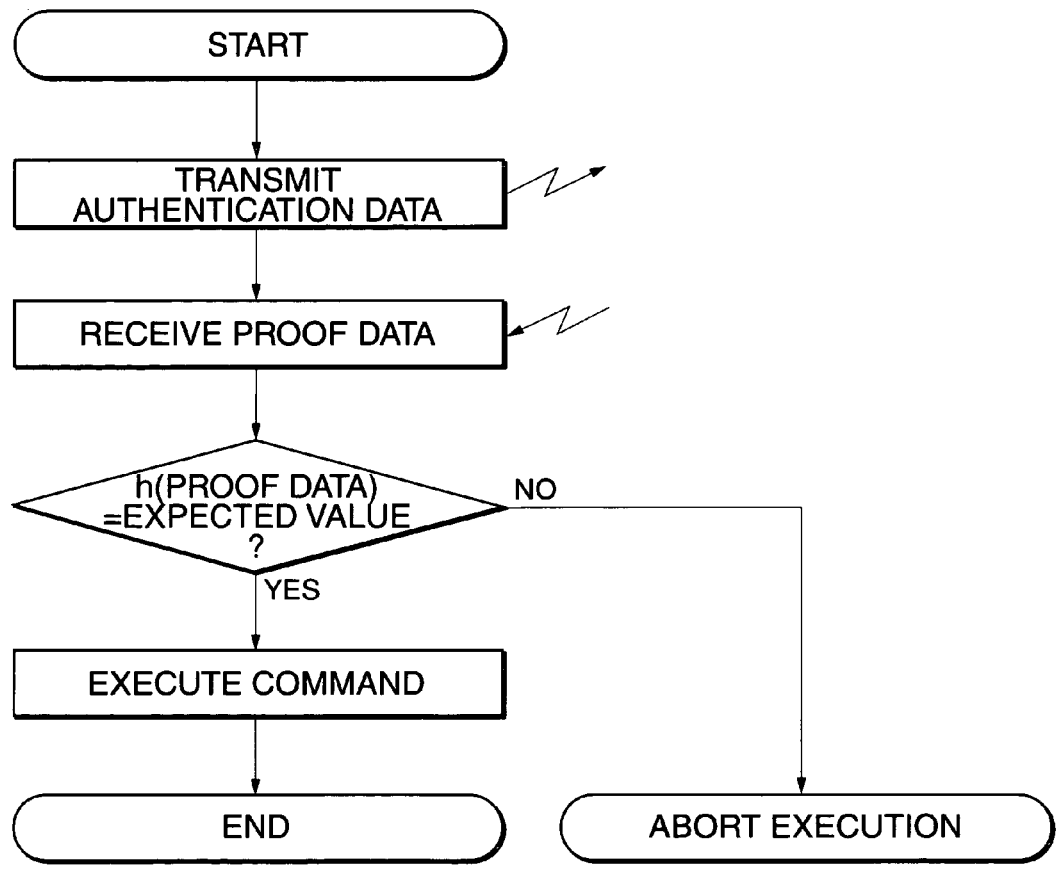
FIG. 11 is a flowchart explaining the operation of the execution unit in FIG. 10.

This configuration controls the command processing as shown in FIG. 11.

However, in case where the comparison unit 310b is configured with a conditional statement in the program, and the proof data verification device 10, especially the execution section 310 is a program that operates with a user's PC or work station, namely, if the analysis and falsification of the program is comparably easy, it will be possible to falsify the program so as to skip the conditional statement, which still has a weak point in this regard.

Figure 12:
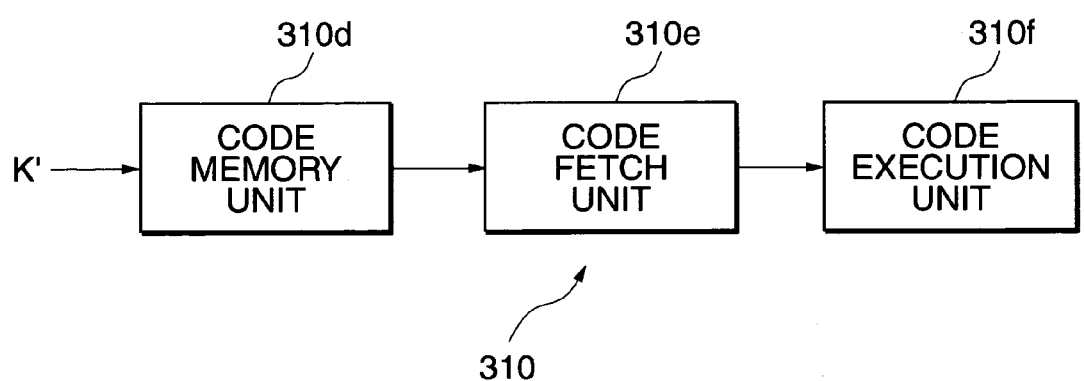
FIG. 12 is a block diagram illustrating another configuration of the execution unit of the proof data verification device according to the second embodiment.

3. Configuration Example: FIG. 12

The third configuration holds the data in which a part or whole of the code of a program for the execution section 310 (execution module of the command processing) of the proof data verification device 10 is encrypted, in the seed for authentication data memory unit 122 as the seed for authentication data C'. That is, K is a part or whole of a code of an execution unit program.

Figure 13:
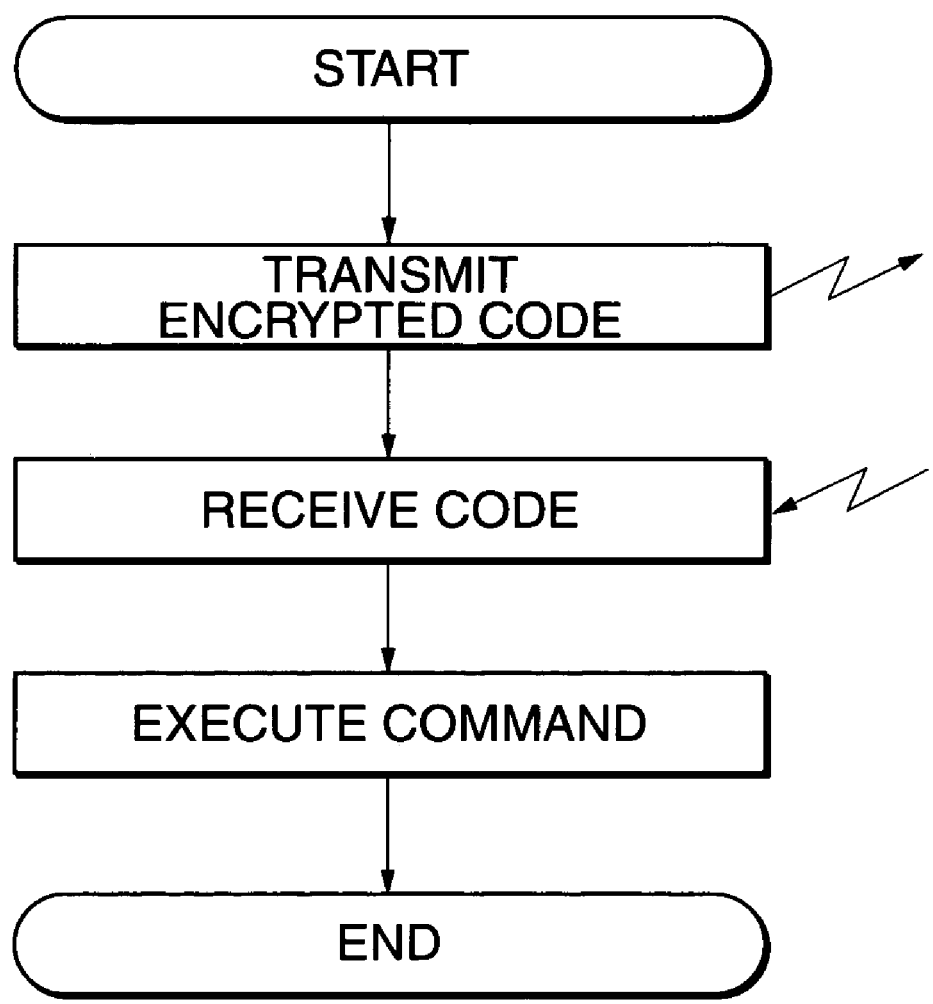
FIG. 13 is a flowchart explaining the operation of the execution unit in FIG. 12.

The execution section 310 embeds the data K' acquired by removing the random number effect from the data answered by the proof data generation device 11 at a predetermined position in the program. That is, the execution section 310 possesses a code memory unit 310d that memorizes the data K' as the code, a code fetch unit 310e that takes this code into the program, and a code execution unit 310f that executes the program. When the proof data generation device 11 answers a correct data, namely, only when K'=K is met, the program becomes executable (FIG. 13).

In this configuration, since a part or whole of the code essential to executing the program for accessing the data is encrypted, even if the security is comparably low such that the execution section 310 is configured as the program that operates with the user's PC or work station, illegal execution can be prevented.

A configuration example will be described further in detail, in which the execution section 310 is the program that operates with the user's PC or work station.

The code memory unit 310d in which the proof data is written is a specified storage area in a computer.

The code execution unit 310f represents a CPU and OS of the computer. The CPU and OS executes executable instructions stored in the program area of the computer. A series of executable instructions that provides a specific function is called program code.

The entity of the code fetch unit 310e is the program code that is first executed in the execution section 310. The code fetch unit 310e is able to designate directly or indirectly the address of the code memory unit 310d to the code execution unit 310f. The code fetch unit 310e may directly designate the physical address of the code memory unit 310d to the code execution unit 310f, or when the OS of the computer executes a virtual addressing, the code fetch unit 310e may designate the virtual address of the code memory unit 310d and convert the virtual address that the OS has received via the CPU into the physical address.

As the code fetch unit 310e being the program is started in a state that the proof data is written in the code memory unit 310d, the code fetch unit 310e instructs the code execution unit 310f to write the contents stored in the address of the code memory unit 310d into a specific address of the program area of the computer, and makes the code execution unit 310f execute.

Next, the code fetch unit 310e instructs the code execution unit 310f with the JMP instruction or the like to execute the executable instructions of the specific address in the program area, the stored contents of the code memory unit 310d acquired by instructing the code execution unit 310f to write.

In this configuration, if the proof data is correctly generated by the proof data generation device 11, the data having been derandomized is a program code, namely, a series of executable instructions to the code execution unit 310f. Accordingly in the above configuration, to follow the program code of the code fetch unit 310e is executed the program code decrypted by the proof data generation device 11.

Figure 14:
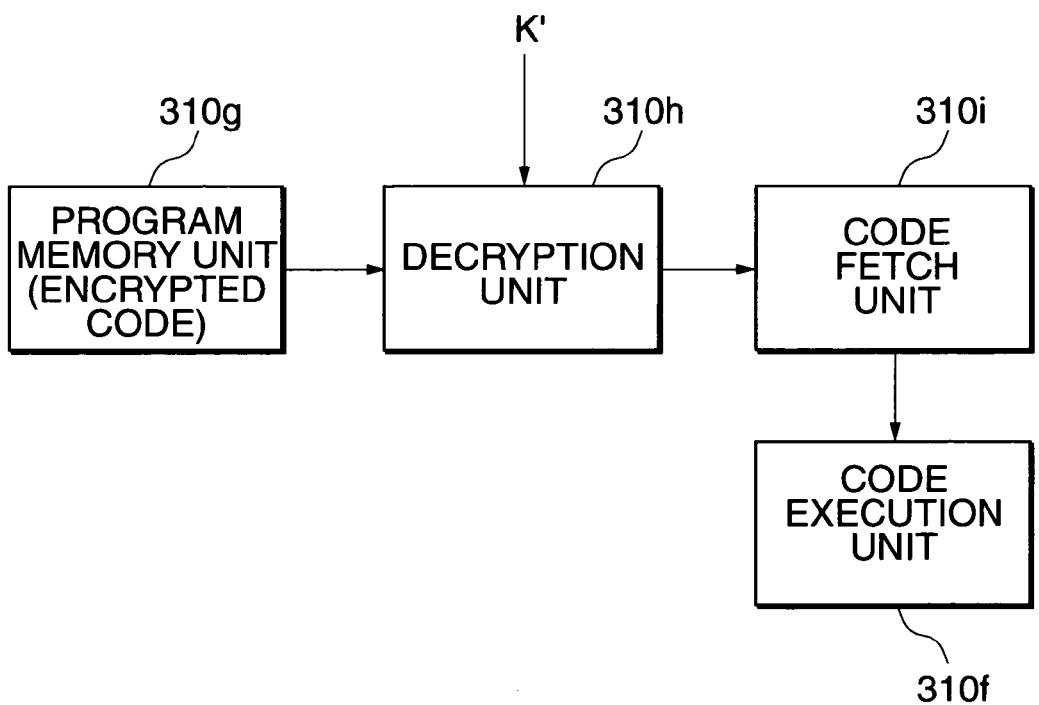
FIG. 14 is a block diagram illustrating another configuration of the execution unit of the proof data verification device according to the second embodiment.

4. Configuration Example: FIG. 14

In the third configuration, the decryption key for decoding the encrypted code can be defined to be the data K. This configuration makes it possible to limit the size of the data K, namely, the size of the seed for authentication data C' to a constant small value, thereby reducing the overhead of communications.

The execution section 310 decrypts the code in the predetermined area of the program, by using the data K' acquired by derandomizing the data answered from the proof data generation device 11. That is, the execution section 310 possesses a program memory unit 310g that memorizes an encrypted program, a decryption unit 310h that reads the encrypted program to decrypt by using the data K', a code fetch unit 310i that fetches the decrypted code, and the code execution unit 310f that executes the fetched code.

A configuration example will be described further in detail, in which the execution section 310 is the program that operates with the user's PC or workstation.

The program memory unit 310g in which the encrypted program is stored is a specified storage area in a computer.

The code execution unit 310f represents the CPU and OS of the computer.

The program memory unit 310g can be defined as a file area in the auxiliary memory, such as a hard disk, etc. In other words, the encrypted program code is memorized as a file.

The entity of the decryption unit 310h is the program code that is first executed in the execution section 310. The decryption unit 310h is able to designate directly or indirectly the address of the program memory unit 310g to the code execution unit 310f.

As the decryption unit 310h being the program with the data K' provided is started, the decryption unit 310h reads the data stored in the program memory unit 310g sequentially or by each specified length of blocks, executes to the data specified decrypt processing of which decryption key is K', and instructs the code fetch unit 310i to write the decrypted result in a specific address of the program area of the computer. This processing writes the execution result of a specific decrypt algorithm at a specified location in the program area, with the data K' as the decryption key, in regard to the encrypted data having been stored in the program memory unit 310g.

Next, the decryption unit 310h instructs the code execution unit 310f with the JMP instruction or the like to execute the executable instructions of the specific address in the program area, the program code decrypted by instructing the code execution unit 310f to write.

Figure 15:
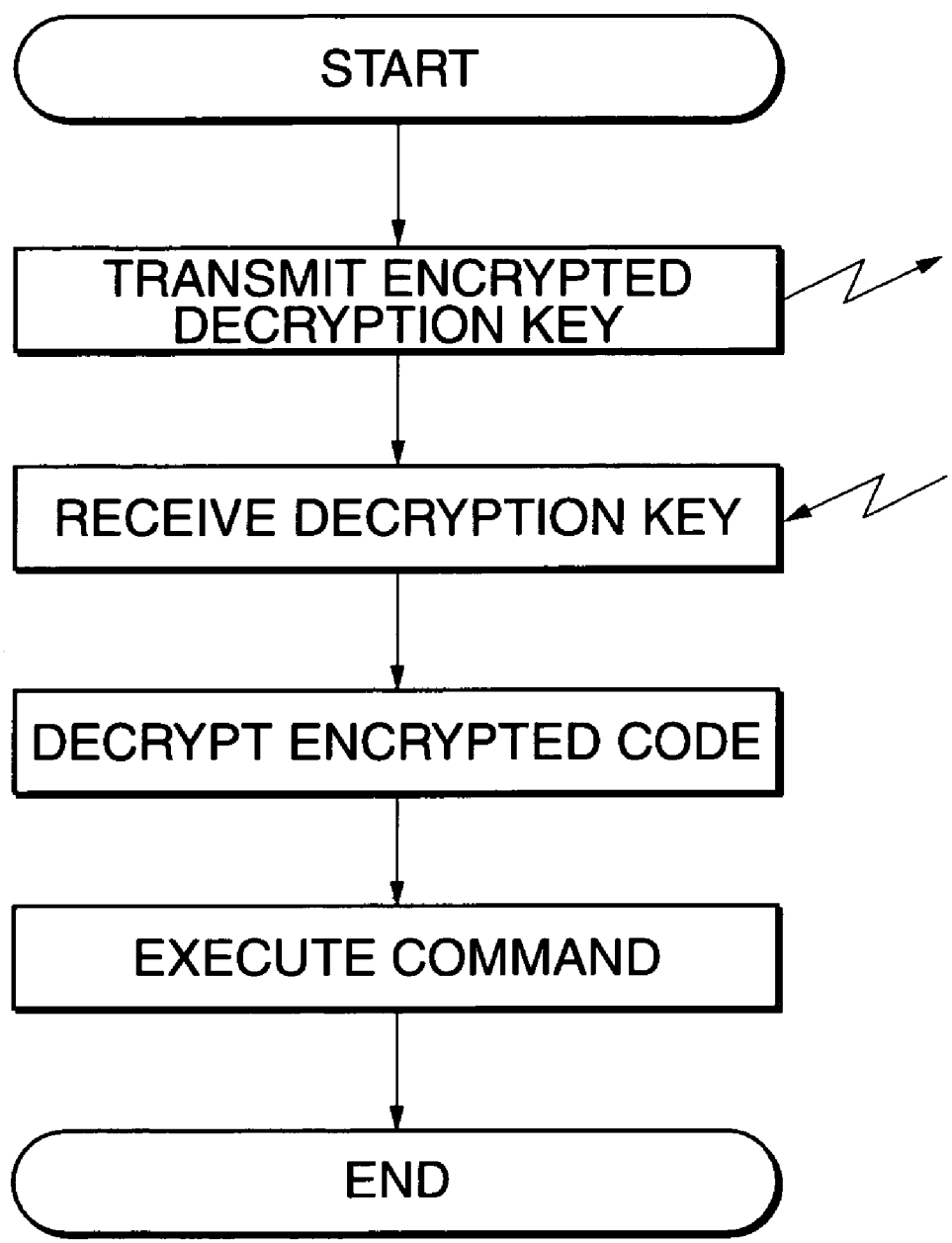
FIG. 15 is a flowchart explaining the operation of the execution unit in FIG. 14.

In this configuration, if the proof data is correctly generated by the proof data generation device 11, the value after having been derandomized will be a decryption key for decoding the encrypted program code stored in the program memory unit 310g. The decryption unit 310h decrypts the encrypted program code with this decryption key, loads the program code being the decrypted result in the program area, and instructs the code execution unit 310f to execute the program code loaded. Therefore, in the foregoing configuration, following the program code of the decryption unit 310h, the program code decrypted by using the decryption key decrypted by the proof data generation device 11 is executed FIG. 15).

Third Embodiment

In the third embodiment of the invention, the access ticket t is the data generated on the basis of the following mathematical expression 16.

$$t=D+F(n,e) \quad (16)$$

The symbols in the above expression signify the following.

n signifies the RSA modulus, namely, a product of sufficiently large two prime numbers p, q (n=p·q).

The user unique identifying information e is a number different by each user, which is used to identify a user.

φ(n) signifies the Eulerian number of n, namely, a product of p−1 and q−1 (φ(n)=(p−1)·(q−1))

D signifies the access ticket private key, the RSA private key modulo n, which satisfies the expression 17.

$$gcd(D,\phi(n))=1 \quad (17)$$

Here, gcd(x, y) denotes the greatest common divisor of the two numbers x, y. The character expressed by the expression (17) ensures that there exists the number E satisfying the expression (18).

$$E \cdot D \cdot \mathrm{mod}\ \phi(n)=1 \quad (18)$$

The number E is called the access ticket public key.

The two-valuable function F(x, y) can be defined as the expression 19, by utilizing the two-valuable function whose function value is not easy to collide, such as the aforementioned one-way hash function.

$$F(x,y)=h(x|y) \quad (19)$$

Figure 16:
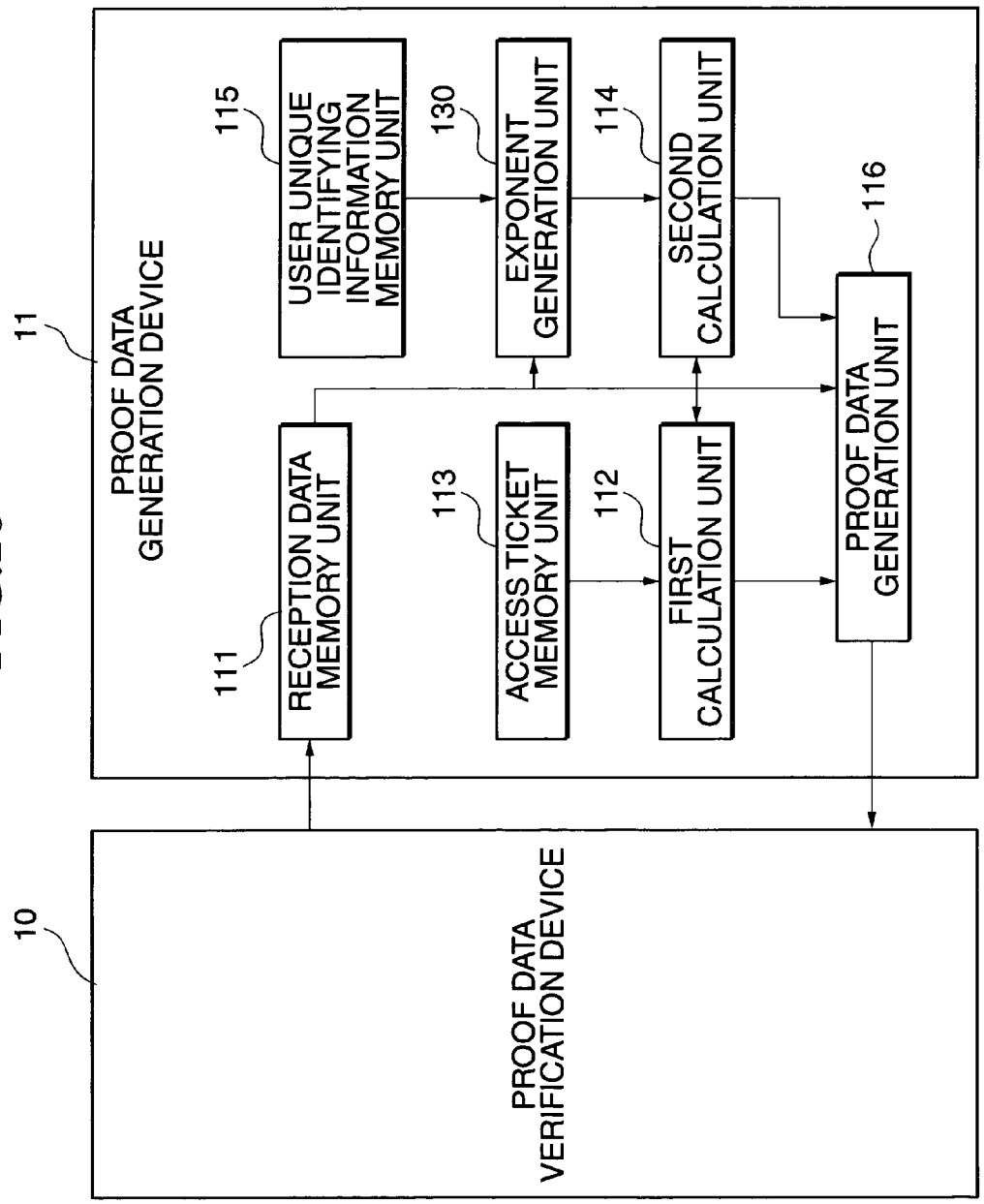
FIG. 16 is a block diagram illustrating the configuration of a data proof generation device according to the third embodiment of the invention.
Figure 17:
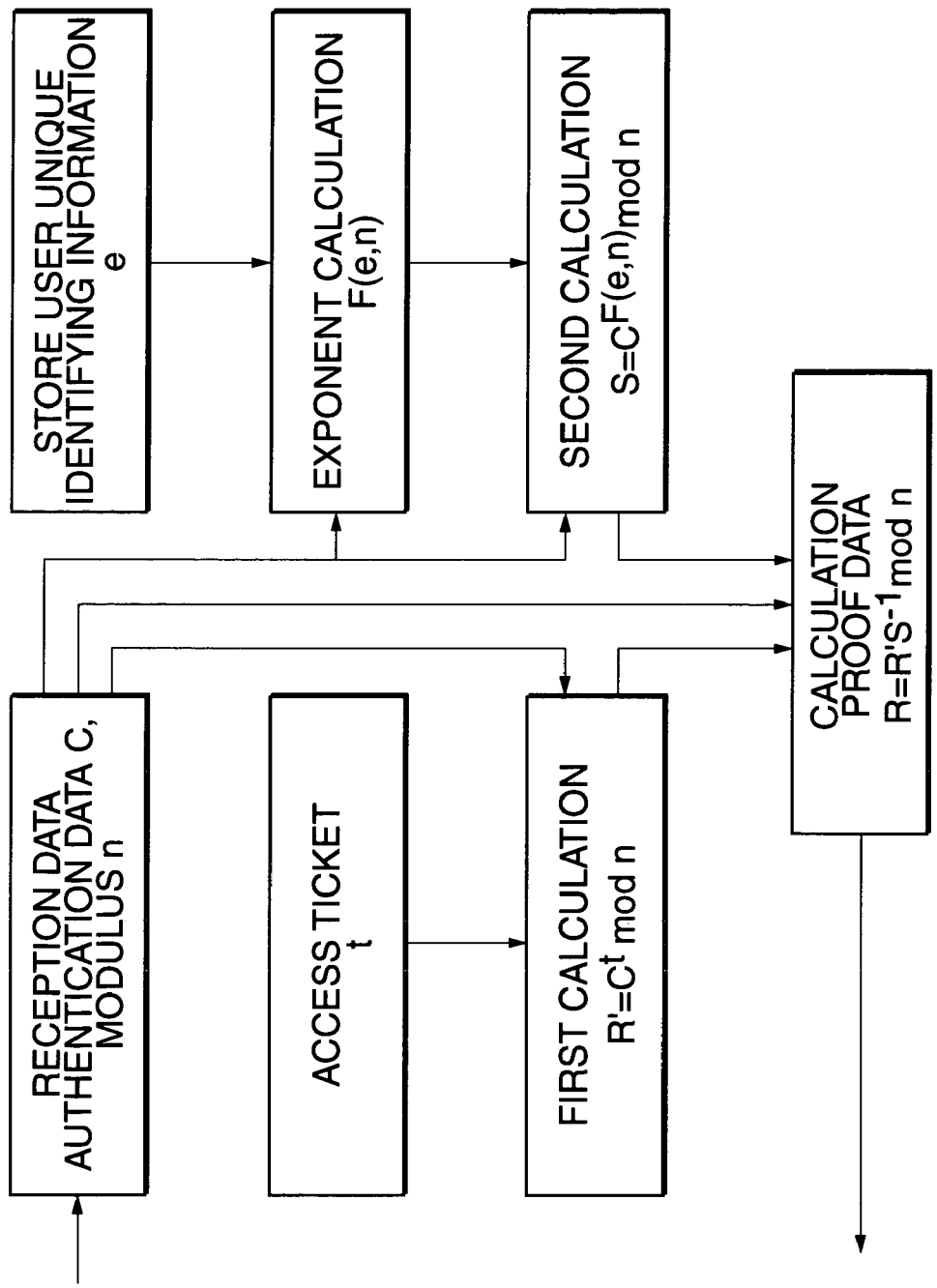
FIG. 17 is a flowchart explaining the operation of the proof data verification device according to the third embodiment.

Referring to the drawings, the second embodiment will be explained further in detail. FIG. 16 illustrates the configuration of the third embodiment relating to the invention, and FIG. 17 illustrates the data flow in FIG. 16. In FIG. 16, the proof data generation device 11 includes the reception data memory unit 111, the first calculation unit 112, the access ticket memory unit 113, the second calculation unit 114, and the user unique identifying information memory unit 115, the proof data generation unit 116, and an exponent generation unit 130. The proof data verification device 10 can adopt the configuration of the first embodiment (FIG. 4) or the second embodiment (FIG. 6), and the description will be omitted.

The operation of this configuration will be explained.

1. The proof data verification device 10 is started by an access of a user. That is, as the command generation device 7 of the application 6 generates a command for data access, the command issuing device 8 issues the command to the command management device 4 of the server 1. This command issuing prompts to start the proof data verification device 10.

2. The proof data verification device 10 writes a pair of the authentication data C and the modulus n of the RSA cipher stored in the access ticket public key memory unit 101 in the reception data memory unit 111 of the proof data generation device 11.

To generate the data C, any one of the methods described in the first and the second embodiment can be applied, and it will not be specified here. Here it is assumed that the data C generated by any one of the above methods is written in the reception data memory unit 111 of the proof data generation device 11.

3. The first calculation unit 112 of the proof data generation device 11 acquires the access ticket t stored in the access ticket memory unit 113, and calculates the expression 20 to acquire the intermediate information R' under the RSA modulus n written into the reception data memory unit 111.

$$R'=C^t \bmod n \quad (20)$$

4. The exponent generation unit 130 of the proof data generation device 11 acquires the user unique identifying information e stored in the user unique identifying information memory unit 115 to calculate the expression 21.

$$F(n,e) \quad (21)$$

5. The second calculation unit 114 of the proof data generation device 11 calculates the expression 22 with the data generated by the exponent generation unit 130, and acquires the difference information S.

$$S=C^{F(n,e)} \bmod n \quad (22)$$

6. The proof data generation unit 116 of the proof data generation device 11 acquires R' and S from the first and second calculation units 112, 114, and calculates the expression 23 to acquire R.

$$R=R'S^{-1} \bmod n \quad (23)$$

Here, $S^{-1}$ is the inverse number of S modulo n, which represents the number that satisfies the expression 24.

$$S \cdot S^{-1} \bmod n=1 \quad (24)$$

7. The proof data generation device 11 answers the data R to the reception data memory unit 105 of the proof data verification device 10.

8. The proof data verification device 10 verifies the proof data supplied by the proof data generation device 11, however the verification method differs depending upon the method of generating the data C as part of the authentication data.

If the data C is generated on the basis of the method in the first embodiment, the verification is executed in accordance with the method mentioned in the first embodiment.

If the data C is generated on the basis of the method in the second embodiment, the verification is executed in accordance with the method mentioned in the second embodiment.

Fourth Embodiment

The fourth embodiment refers to a case such that, in the first through third embodiments, the proof data generation device is configured by a program operating with a user's PC or a work station and portable operation unit such as an IC card or a PC card (PCMCIA card) loaded on the PC or the work station.

In the proof data generation device 11 of the first and third embodiments, the user unique identifying information e is private information, which has to be guarded not to be leaked outside. And, if the operation of the second calculation unit 114 is observed which executes a calculation using the user unique identifying information e, there will emerge a risk of leaking the user unique identifying information e. Also, if the calculation process of the function F(x, y) in the third embodiment is observed, it will lead to the same risk. That is, to prevent the leakage of the user unique identifying information, the insides of the user unique identifying information unit 115, the second calculation unit 114, and the exponent generation unit 130 must be protected from an outside observer. In order to achieve this object, it is effective to configure a part of the proof data generation unit 11 by hardware.

If the portable unit such as an IC card or a PC card is used, as this type of the hardware, it will enhance conveniences to a user. The part unique to a user inside the proof data generation device is the user unique identifying information unit and the access ticket memory unit only. Therefore as an example, if the user unique identifying information unit 115, the access ticket memory unit 113, the second calculation unit 114, and the exponent generation unit 130 are made to be configured inside the IC card or PC card, and the remaining parts are made to be configured by a program that operates with a user's PC or work station, the part unique to each user of the proof data generation device 11 will be implemented as the IC card or PC card that each user can carry, and the common part irrelevant to the user will be configured as a program commonly with an arbitrary PC or work station. Such a configuration will enable any user to utilize the PC or work station as the proof data generation device for the user, with only the loading of the user's own IC card or PC card on the arbitrary PC or work station having the program installed.

Incidentally, the hardware having a special configuration for preventing the data or program stored in the internal memory from being observed or tampered with is called the tamper resistant hardware. The method of configuring the tamper resistant hardware is disclosed, for example, in Japanese Patent Applications No. 1863953 and No. 1860463, and the Japanese Unexamined Patent Application NO. Hei 3-100753, etc.

In Japanese Patent Application No. 1863953, the information storage medium is surrounded by a structure made of plural cards having various types of conductive patterns. The stored information is destroyed when a detected conductive pattern is different from the predictive pattern.

In Japanese Patent Application No. 1860463, the information storage medium is surrounded by a conductive coil, and is provided with a detection circuit formed by an integrating circuit, etc., whereby invasion into the electronic circuit area is detected by fluctuation of the electromagnetic energy, and the stored information is destroyed.

In Japanese Unexamined Patent Application NO. Hei 3-100753, an optical detector is provided inside the hardware. The optical detector detects an incoming external light when the hardware is pressured to be destroyed or perforated, and a memory destruction device resets the stored information.

If the above tamper resistant hardware is implemented by a portable operation device such as an IC card or a PC card (PCMCIA card), it will provide a user with still more conveniences.

Further, a micro controller mounted on the IC card is esteemed to bear significant tamper resistance by itself, because of its high-density mounting.

Figure 18:
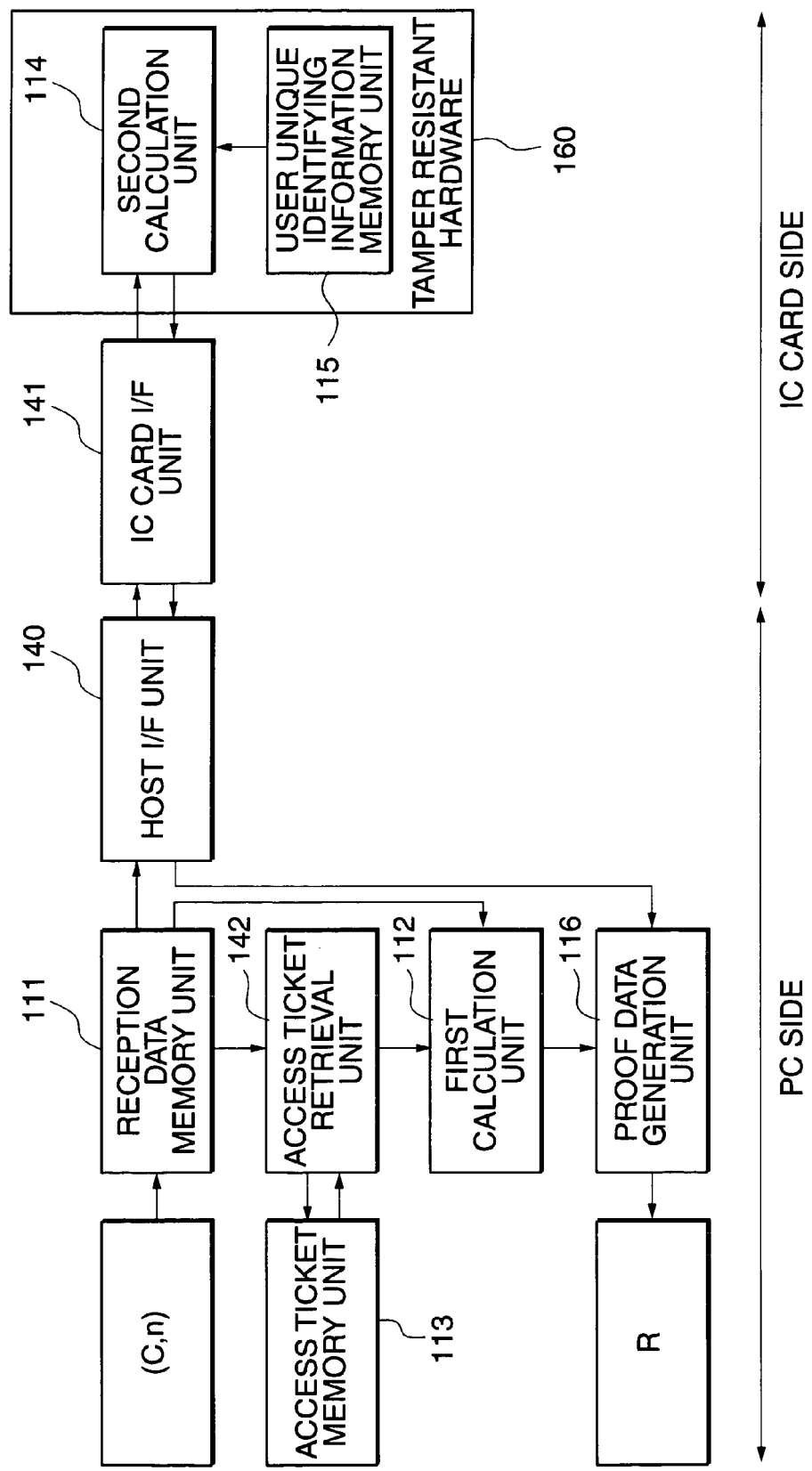
FIG. 18 is a block diagram illustrating a configuration according to the fourth embodiment of the invention.

FIG. 18 illustrates a configuration, in which the user unique identifying information memory unit 115 that holds the user unique identifying information e and the second calculation unit 114 that generates the difference information are sealed in tamper resistant hardware 160 such as an IC card.

Figure 19:
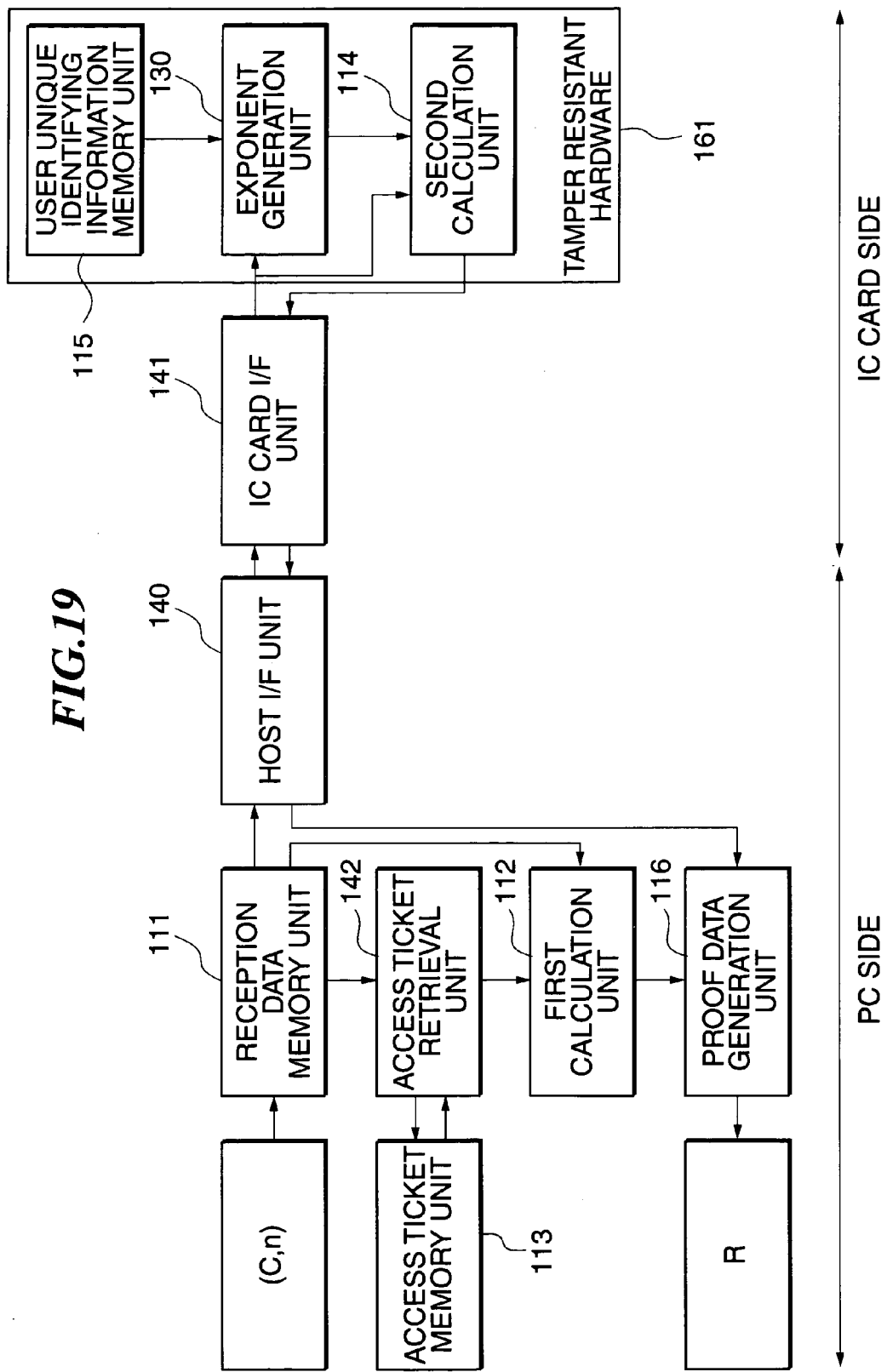
FIG. 19 is a block diagram illustrating another configuration according to the fourth embodiment of the invention.

FIG. 19 illustrates a configuration, in which in addition to the user unique identifying information memory unit 115 that holds the user unique identifying information e and the second calculation unit 114 that generates the difference information, the exponent generation unit 130 is also sealed in tamper resistant hardware 161.

Figure 20:
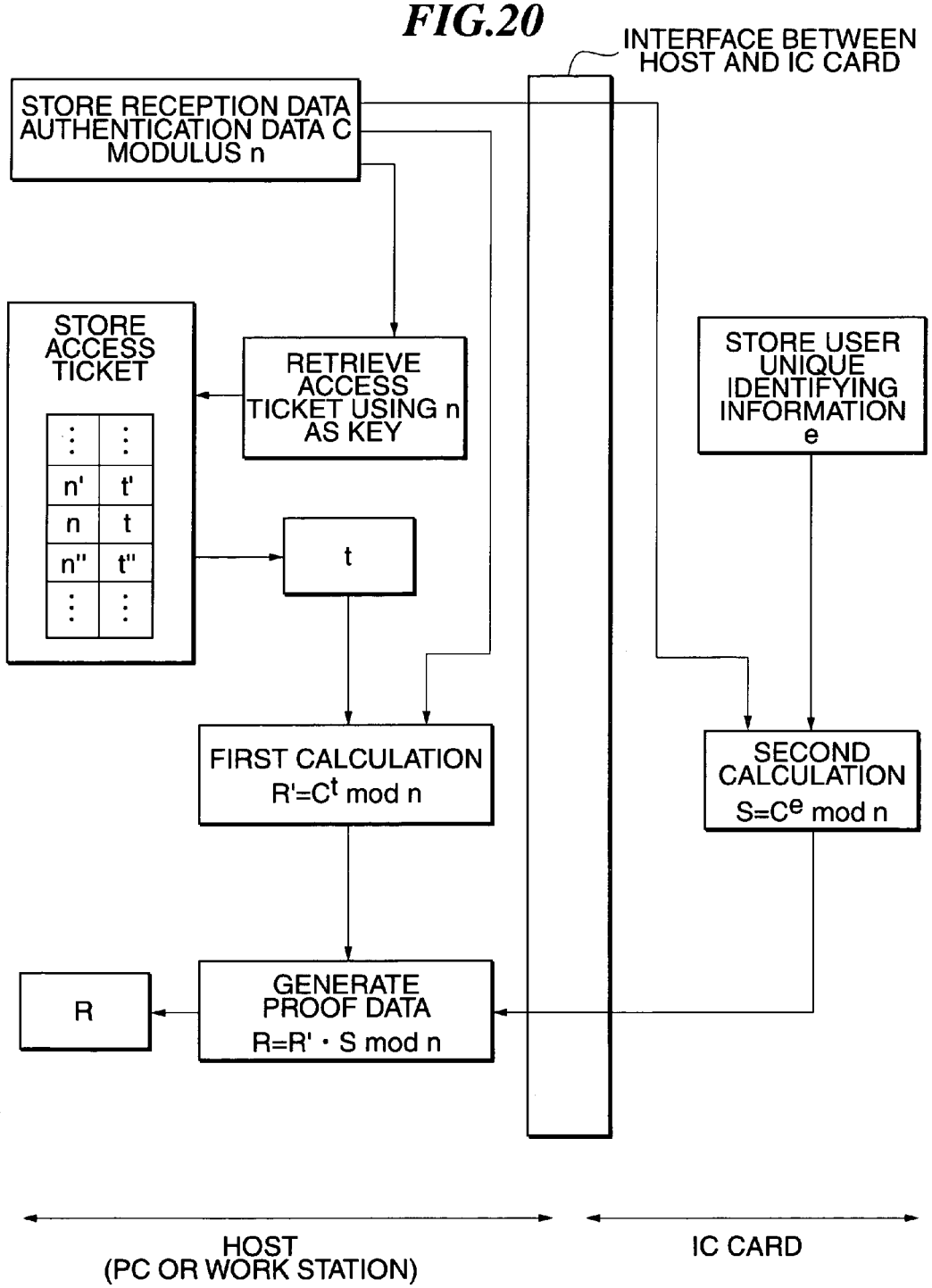
FIG. 20 is a flowchart explaining the operation in FIG. 18.

An IC card I/F unit 141 is the IC card interface that administers the communication between the host and the IC card, which is configured by a communication buffer and a communication program. The remaining part of the proof data generation device is configured as a program that operates with a user's PC or work station. The function in the tamper resistant hardware 160 or 161 is just the same as described in the first through third embodiments, and the function of that part will not be explained. Further, to simplify the explanation, the tamper resistant hardware is assumed to be an IC card, however this assumption will not restrict the generality of this invention. FIG. 20 illustrates the data flow in FIG. 18.

Next, the operation will be explained.

1. The proof data verification device 10 is started by access of a user.

2. The proof data verification device 10 writes the authentication data C and the modulus n of the RSA cipher stored in the access ticket public key memory unit 101 in the reception data memory unit 111 of the proof data generation device 11.

3. A host interface unit 140 of the proof data generation device 11 transfers the authentication data C and the modulus n written in the reception data memory unit 111 to the IC card interface unit 141. The host interface unit 140 administers the data communication between the host and the IC card in cooperation with the IC card interface unit 141 furnished in the IC card.

4. An access ticket retrieval unit 142 obtains to retrieve the access ticket t stored in the access ticket memory unit 113, using the RSA modulus n as the retrieval key.

5. The first calculation unit 112 calculates the expression 25 to acquire the intermediate information R' under the RSA modulus n written in the reception data memory unit 111.

$$R' = C^t \bmod n \qquad (25)$$

6. Next, the host interface unit 140 issues a command to the IC card interface unit 141, and receives the difference information S as an answered value thereof.

When the access ticket and the functions inside the IC card are configured in accordance with the first or the second embodiment, the difference information S is the value calculated by the expression 26.

$$S = C^e \bmod n \qquad (26)$$

7. The proof data generation unit 116 of the proof data generation device 11 acquires R' and S from the first and second calculation units 112, 114, and calculates the expression 27 to acquire R.

$$R = R'S \bmod n \tag{27}$$

8. The proof data generation device 11 answers R to the reception data memory unit 105 of the proof data verification device 10.

In the foregoing function, the calculation of the intermediate information R' and the difference information S is executed in parallel by the host side being a user PC or work station and the IC card side incorporating the calculation function; and accordingly, the execution time for calculating the proof data R after the proof data generation device 11 receives the authentication data C and the modulus n can be reduced, which enhances the execution efficiency.

In this embodiment, plural access tickets are stored in the access ticket memory unit 113, but since different access tickets accompany different RSA modulus n, the access ticket is stored in association with the modulus n so as to retrieve using the modulus n as the key.

The RSA modulus n that the application and server use for the access control is basically different in each application and server.

The access ticket retrieval unit 142 retrieves an appropriate access ticket using the RSA modulus n given by the proof data verification device 10 as the key, and serves the access ticket for the generation of the proof data thereafter. This retrieval function enables the proof data generation device 11 to calculate and answer appropriate proof data in accordance with the object (individual application or individual server) to be accessed, without imposing any burden to a user.

Fifth Embodiment

The fifth embodiment employs the Pohlig-Hellman asynchronous key cipher instead of the RSA public key cipher that was used in the third embodiment.

The Pohlig-Hellman asynchronous key cipher using a large prime number p as the modulus is the same cipher system as the RSA public key cipher, except that the latter uses a product (n p q) of two prime numbers as the modulus. However, in the RSA public key cipher, since it was extremely difficult to calculate the key D on one side based on the key E on the other side and the modulus n, it was possible to use the key E and the modulus n as the public key and use the key D as the private key. In the Pohlig-Hellman asynchronous key cipher on the other hand, since the key D can easily be calculated from the key E and the prime number p, E and p cannot be used as the public key. That is, both E and p are required to be private between the parties, and the Pohlig-Hellman asynchronous key cipher has to adopt the same mode of use as the common key cipher such as the DES (Data Encryption Standard).

In this embodiment, the access ticket t is the data generated on the basis of the following expression 28.

$$t = D + F(p, e) \tag{28}$$

The symbols in the above expression signify the following.

p is a sufficiently large prime number.

The user unique identifying information e is a number different by each user, which is used to identify a user.

The access ticket private key D is the key on one side of the Pohlig-Hellman asynchronous key cipher under the modulus p, which satisfies the expression 29.

$$\gcd(D, p-1) = 1 \tag{29}$$

Here, gcd(x, y) denotes the greatest common divisor of the two numbers x, y.

The character expressed by the expression (29) ensures that there exists the number E satisfying the expression (30).

$$E \cdot D \bmod p - 1 = 1 \tag{30}$$

The two-valuable function F(x, y) can be defined as the expression 31, by utilizing the two-valuable function whose function value is not easy to collide, such as the aforementioned one-way hash function h.

$$F(x, y) = h(x|y) \tag{31}$$

Figure 21:
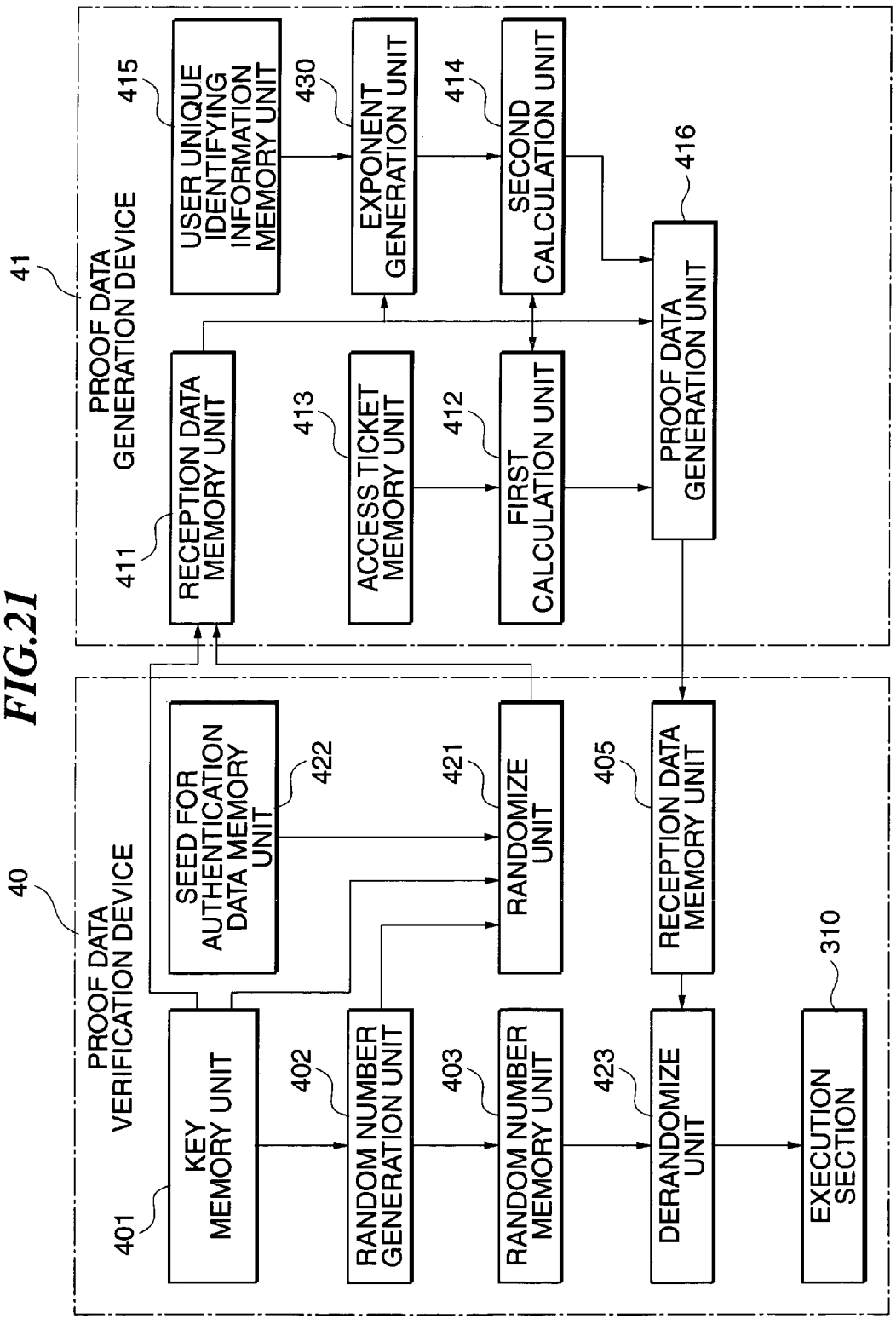
FIG. 21 is a block diagram illustrating a configuration according to the fifth embodiment of the invention.
Figure 22:
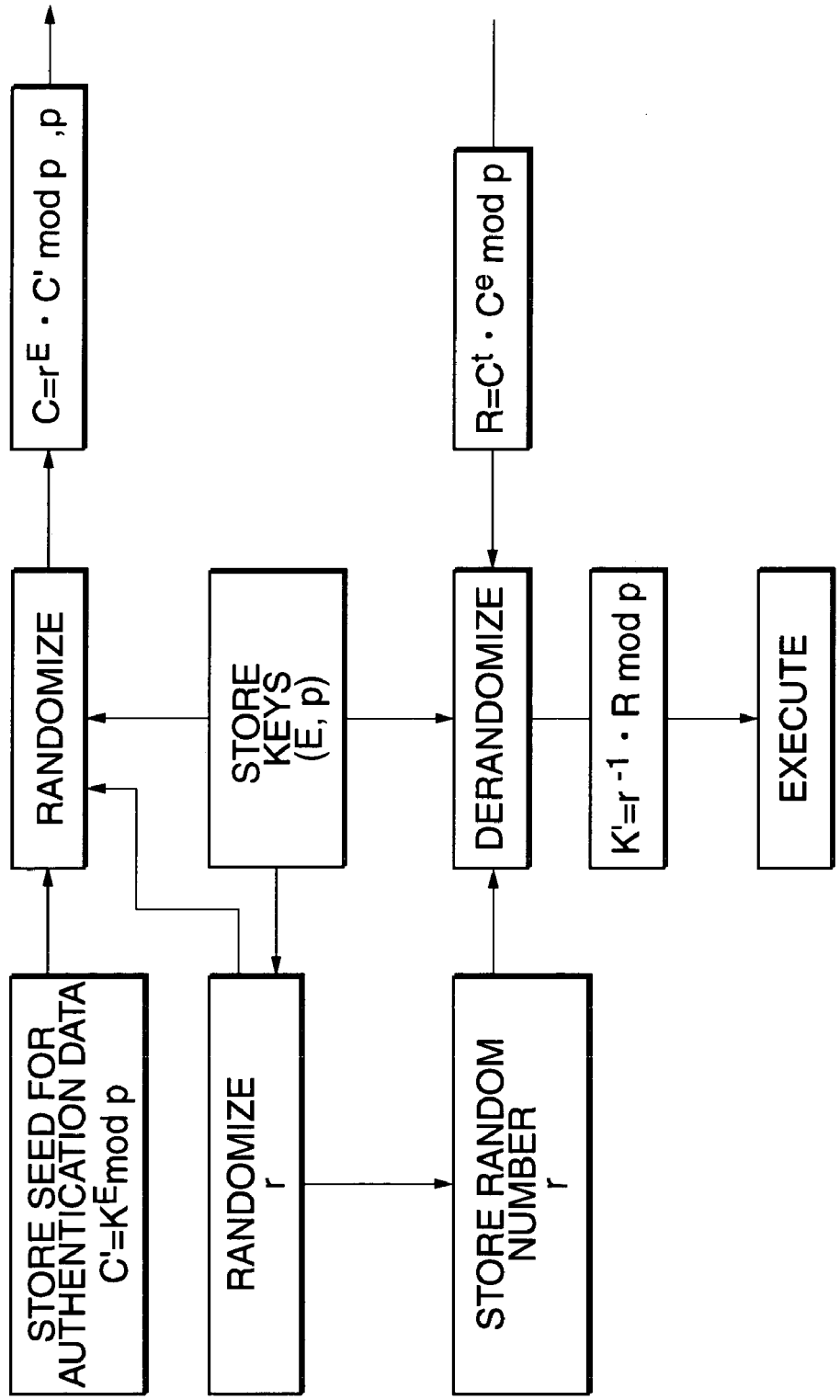
FIG. 22 is a flowchart explaining the operation of the proof data verification device according to the fifth embodiment.

Next, the fifth embodiment will further be detailed with reference to FIG. 21 and FIG. 22. FIG. 21 illustrates the configuration of the fifth embodiment, and FIG. 22 illustrates the data flow in FIG. 21. In FIG. 21, a proof data verification device 40 includes a key memory unit 401, a random number generation unit 402, a random number memory unit 403, a reception data memory unit 405, a randomize unit 421, a seed for authentication data memory unit 422, a derandomize unit 423, and the execution section 310. And, a proof data generation device 41 includes a reception data memory unit 411, a first calculation unit 412, an access ticket memory unit 413, a second calculation unit 414, a user unique identifying information memory unit 415, a proof data generation unit 416, and an exponent generation unit 430.

Next, the operation will be explained.

1. The proof data verification device 40 is started by an access of a user.

2. The proof data verification device 40 writes a pair of the authentication data C and the modulus p stored in the key memory unit 401 in the reception data memory unit 411 of the proof data generation device 11.

In this embodiment, the method of generating the data C is based on the one described in the second embodiment, however it is not difficult to configure a method based on the one described in the first embodiment.

The random number generation unit 402 of the proof data verification device 40 generates the random number r to be prime to the modulus p stored in the key memory unit 401, which is recorded in the random number memory unit 403. The randomize unit 421 acquires the exponent E stored in the key memory unit 401 and the modulus p, and also the data C' stored in the seed for authentication data memory unit 422, and calculates the expression 32.

$$C = r^E C' \bmod p \tag{32}$$

Here, the seed for authentication data C' is generated so as to satisfy the relational expression 33 in regard to the data K, which is the value stored in the seed for authentication data memory unit 422.

$$C' = K^E \bmod p \tag{33}$$

3. The first calculation unit 412 of the proof data generation device 41 acquires the access ticket t stored in the access ticket memory unit 413, and calculates the expression 34 to acquire the intermediate information R' under the RSA modulus p written in the reception data memory unit 411.

$$R' = C^t \bmod p \tag{34}$$

4. The exponent generation unit 430 of the proof data generation device 41 acquires the user unique identifying information e stored in the user unique identifying information memory unit 415, and calculates the expression 35.

$$F(p,e) \quad (35)$$

5. The second calculation unit 414 of the proof data generation device 41 calculates the expression 36 by using the data generated by the exponent generation unit 430, and acquires the difference information S.

$$S = C^{F(p,e)} \bmod p \quad (36)$$

6. The proof data generation unit 416 of the proof data generation device 41 acquires R' and S from the first and second calculation units 412, 414, and calculates the expression 37 to acquire R.

$$R = R'S^{-1} \bmod p \quad (37)$$

Here, $S^{-1}$ is the inverse number of S modulo p, which represents the number that satisfies the expression 38.

$$S \cdot S^{-1} \bmod p = 1 \quad (38)$$

7. The proof data generation device 41 answers the data R to the reception data memory unit 405 of the proof data verification device 40.

8. The derandomize unit 423 of the proof data verification device 40 fetches the previously generated random number r from the random number memory unit 403, and calculates the expression 39.

$$K' = r^{-1} R \bmod p \quad (39)$$

Only when the combination of the access ticket t and the user unique identifying information e which are used in the proof data generation device 41 is correct, the data K' and K acquired by the calculation become equal.

Sixth Embodiment

The sixth embodiment of the invention presents a configuration employing the ElGamal public key cipher instead of the RSA public key cipher in the third embodiment.

In the sixth embodiment, the access ticket t is the data generated on the basis of the following expression 40.

$$t = X + F(p,e) \quad (40)$$

The symbols in the above expression signify the following.

p is a sufficiently large prime number.

The user unique identifying information e is a number different by each user, which is used to identify a user.

The access ticket private key X is the private key of the ElGamal cipher under the modulus p, and Y is assumed to be the corresponding public key, which satisfies the expression 41.

$$Y = a^X \bmod p \quad (41)$$

Here, a represents a generator of a multiplication group of a finite field in the order p, which satisfies the following expressions 42 and 43.

$$a \neq 0 \quad (42)$$

$$\min\{x > 0 | a^x = 1 \bmod p\} = p - 1 \quad (43)$$

Y is called the access ticket public key.

The two-valuable function F(x, y) can be defined as the expression 44, by utilizing the two-valuable function whose function value is not easy to collide, such as the aforementioned one-way hash function h.

$$F(x,y) = h(x|y) \quad (44)$$

Figure 23:
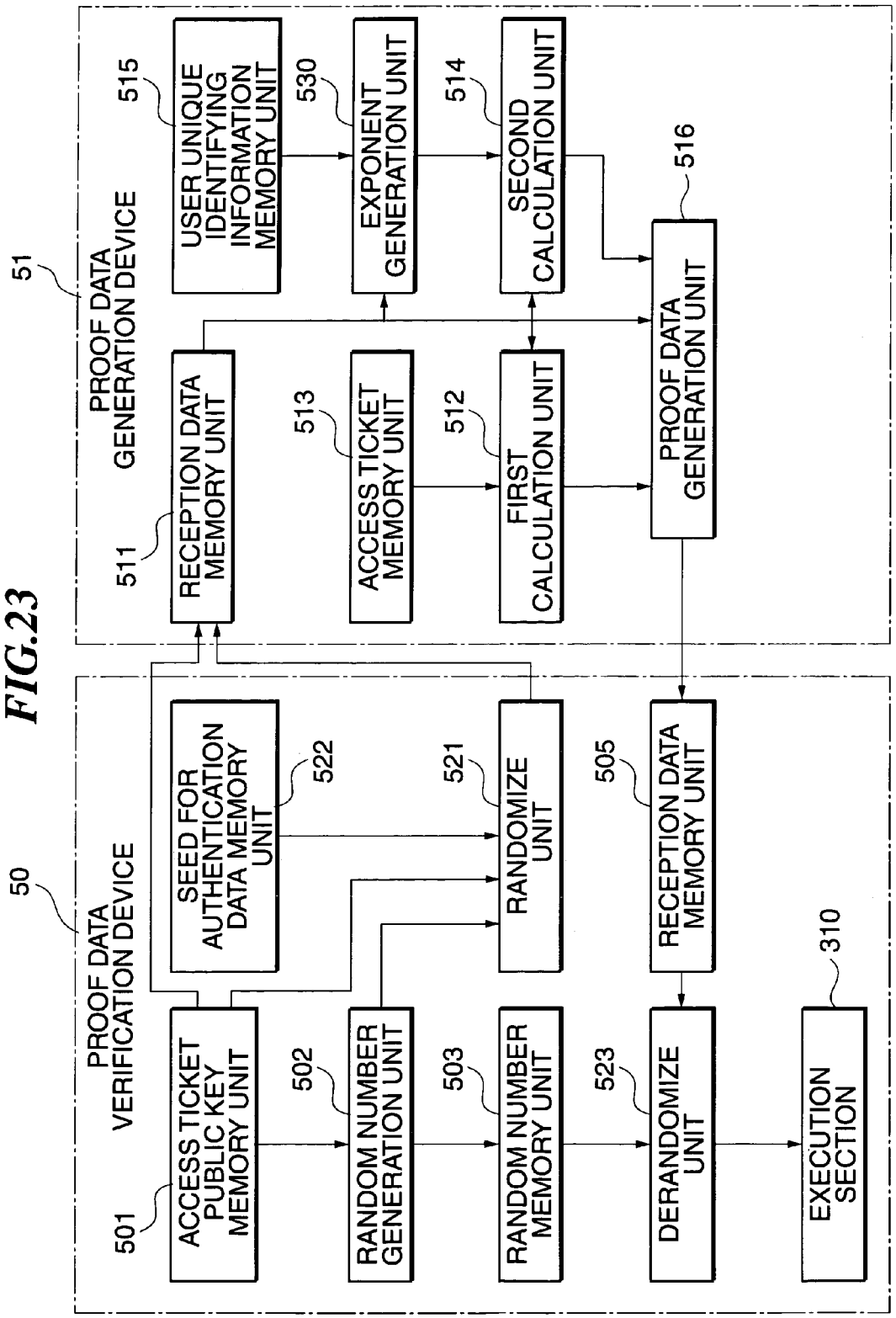
FIG. 23 is a block diagram illustrating a configuration according to the sixth embodiment of the invention.
Figure 24:
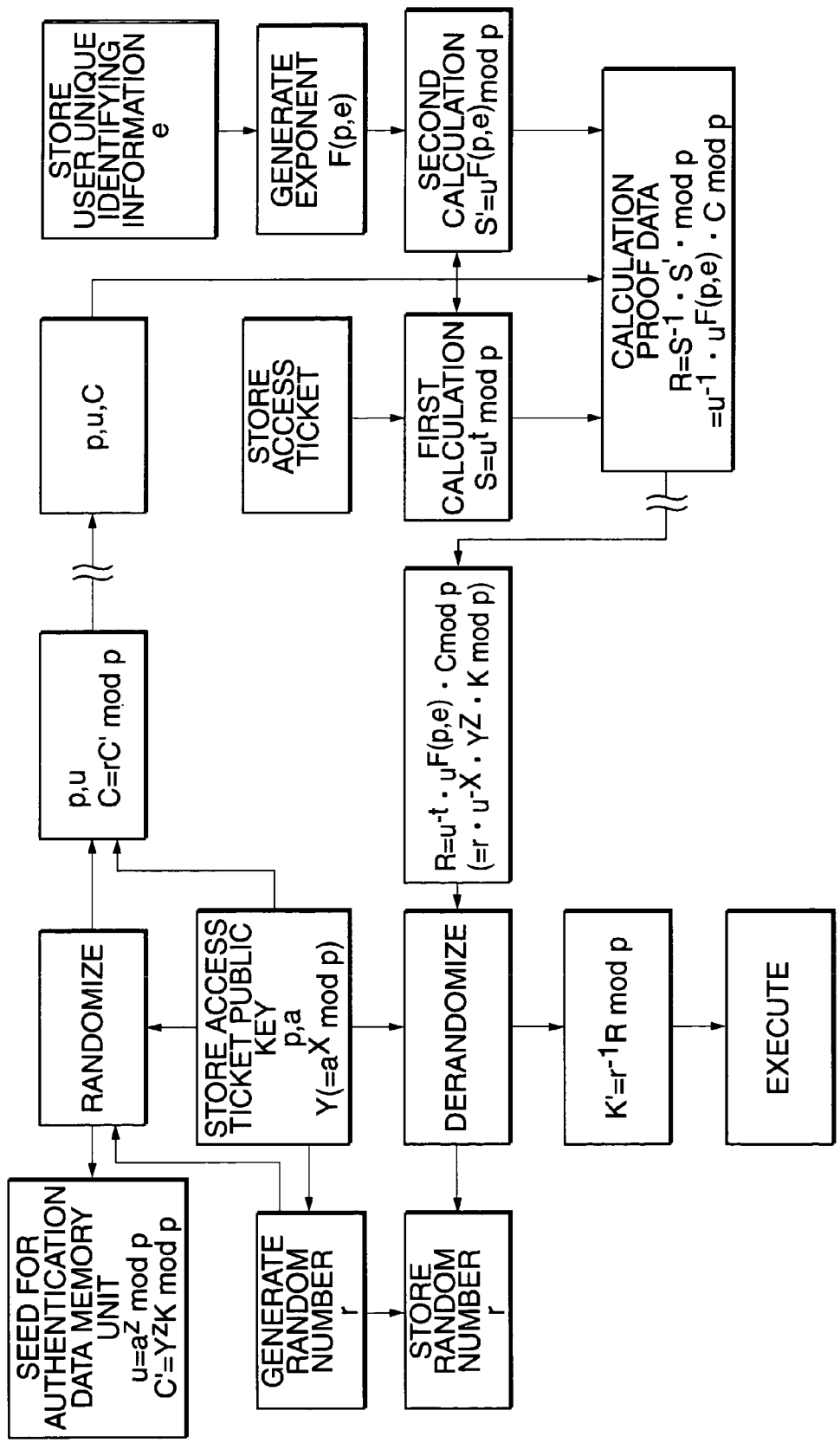
FIG. 24 is a flowchart explaining the operation of the sixth embodiment.

Next, the sixth embodiment will further be explained with reference to FIG. 23 and FIG. 24. FIG. 23 illustrates the configuration of the sixth embodiment, and FIG. 24 illustrates the data flow in the sixth embodiment. In FIG. 23, a proof data verification device 50 includes an access ticket public key memory unit 501, a random number generation unit 502, a random number memory unit 503, a reception data memory unit 505, a randomize unit 521, a seed for authentication data memory unit 522, a derandomize unit 523, and the execution section 310. And, a proof data generation device 51 includes a reception data memory unit 511, a first calculation unit 512, an access ticket memory unit 513, a second calculation unit 514, a user unique identifying information memory unit 515, a proof data generation unit 516, and an exponent generation unit 530.

Next, the operation will be explained.

1. The proof data verification device 50 is started by an access of a user.

2. The proof data verification device 50 writes a pair of the authentication data u, C and the modulus p stored in the access ticket public key memory unit 501 into the reception data memory unit 511 of the proof data generation device 51.

The seed for authentication data u, C' are stored in the seed for authentication data memory unit 522, which satisfy the following properties.

u represents the number that the above a is exponentiated modulo p by an appropriate random number z as an exponent, which satisfies the expression 45.

$$u = a^z \bmod p \quad (45)$$

C' represents a product of the number that the access ticket Y is exponentiated modulo p by the random number z and an appropriate data K, which satisfies the expression 46.

$$C' = Y^z K \bmod p \quad (46)$$

The authentication data C is generated in the following manner.

In the proof data verification device 50, the random number generation unit 502 generates the random number r to be prime to the modulus p held in the access ticket public key memory unit 501, which is stored in the random number memory unit 503.

Next, the randomize unit 521 receives the data C' stored in the seed for authentication data memory unit 522, and calculates the expression 47.

$$C = rC' \bmod p \quad (47)$$

3. The first calculation unit 512 of the proof data generation device 51 acquires the access ticket t stored in the access ticket memory unit 513, and calculates the expression 48 under the modulus p written into the reception data memory unit 511 to acquire the intermediate information S.

$$S = u^t \bmod p \quad (48)$$

4. The exponent generation unit 530 of the proof data generation device 51 acquires the user unique identifying information e stored in the user unique identifying information memory unit 515 to calculate the expression 49.

$$F(p,e) \quad (49)$$

5. The second calculation unit 514 of the proof data generation device 51 calculates the expression 50 with the data generated by the exponent generation unit 530, and acquires the difference information S'.

$$S' = u^{F(p,e)} \bmod p \quad (50)$$

6. The proof data generation unit 516 of the proof data generation device 51 acquires S and S' from the first and second calculation units 512, 514, and calculates the expression 51 to acquire R.

$$R = S^{-1} S' C \bmod p \tag{51}$$

Here, $S^{-1}$ is the inverse number of S modulo p, which represents the number that satisfies the expression 52.

$$S \cdot S^{-1} \bmod p = 1 \tag{52}$$

7. The proof data generation device 51 answers the data R to the reception data memory unit 505 of the proof data verification device 50.

8. The derandomize unit 523 of the proof data verification device 50 fetches the previously generated random number r from the random number memory unit 503, and calculates the expression 53.

$$K' = r^{-1} R \bmod p \tag{53}$$

Only when the combination of the access ticket t and the user unique identifying information e which are used in the proof data generation device 51 is correct, the data K' and K acquired by the calculation become equal. Now, assuming that the foregoing configuration is embodied as it is, there appears the following problems. That is, if one applies the identical seed for authentication data u, C' to the authentication procedure of the access right several times, it will enable the one to configure a device imitating the function of the proof data generation device 51 without the user unique identifying information and the access ticket. First of all, at the first authentication procedure, the expression, $H = RC^{-1} \bmod p$, is calculated with the seed for authentication data C issued by the proof data verification device 50 and the proof data R generated by the proof data generation device 51. An imitation device records the H thus calculated instead of the user unique identifying information and the access ticket. With regard to an arbitrary seed for authentication data (u, C) that the proof data verification device 50 issues, the imitation device needs to generate the proof data R in accordance with the expression, $R = HC \bmod p$, and to answer it to the proof data verification device 50. To cope with this attack, it is conceivable to store as many pairs of the seed for authentication data u, C' as necessary in the seed for authentication data memory unit 522, and to use the data pair at each time of the authentication procedure and then throw it away. Here, with regard to the mutually different seed for authentication data, the random number z used for generating the data is set to be mutually different.

Seventh Embodiment

The seventh embodiment of the invention presents a configuration employing a signature key signed by the ElGamal as unique security characteristic information.

In the seventh embodiment, the access ticket t is the data generated on the basis of the following expression 54.

$$t = X + F(p, e) \tag{54}$$

The symbols in the above expression signify the following.

p is a sufficiently large prime number.

The user unique identifying information e is a number different by each user, which is used to identify a user.

The access ticket private key X is the signature key signed by the ElGamal under the modulus p, and Y is assumed to be the corresponding public key, which satisfies the expression 55.

$$Y = a^X \bmod p \tag{55}$$

Here, a represents a generator of a multiplication group of a finite field in the order p, which satisfies the following expressions 56 and 57.

$$a \neq 0 \tag{56}$$

$$\min \{x > 0 | a^x = 1 \bmod p\} = p - 1 \tag{57}$$

Y is called the access ticket public key.

The two-valuable function F(x, y) can be defined as the expression 58, by utilizing the two-valuable function whose function value is not easy to collide, such as the aforementioned one-way hash function h.

$$F(x, y) = h(x|y) \tag{58}$$

Figure 25:
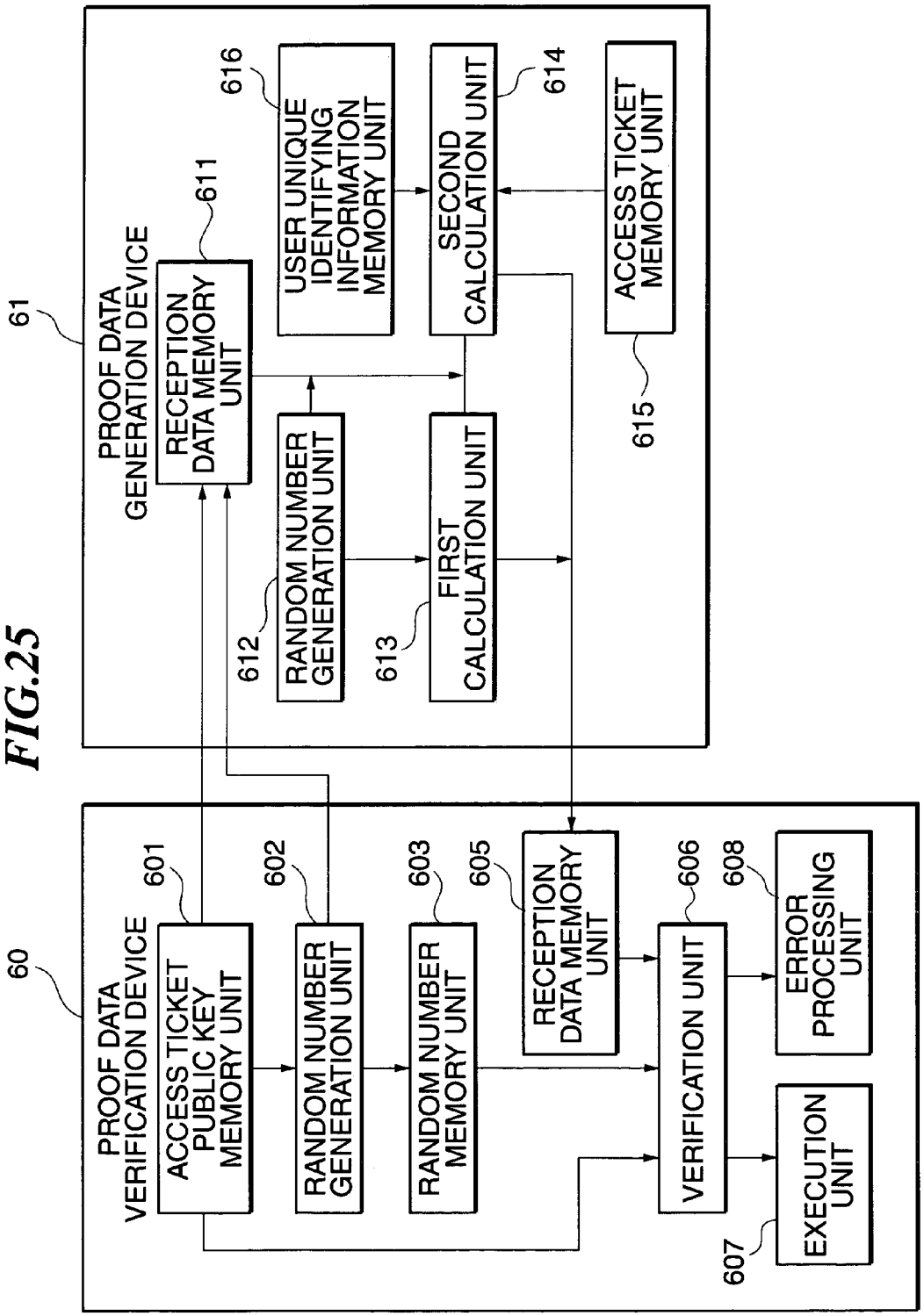
FIG. 25 is a block diagram illustrating a configuration according to the seventh embodiment of the invention.
Figure 26:
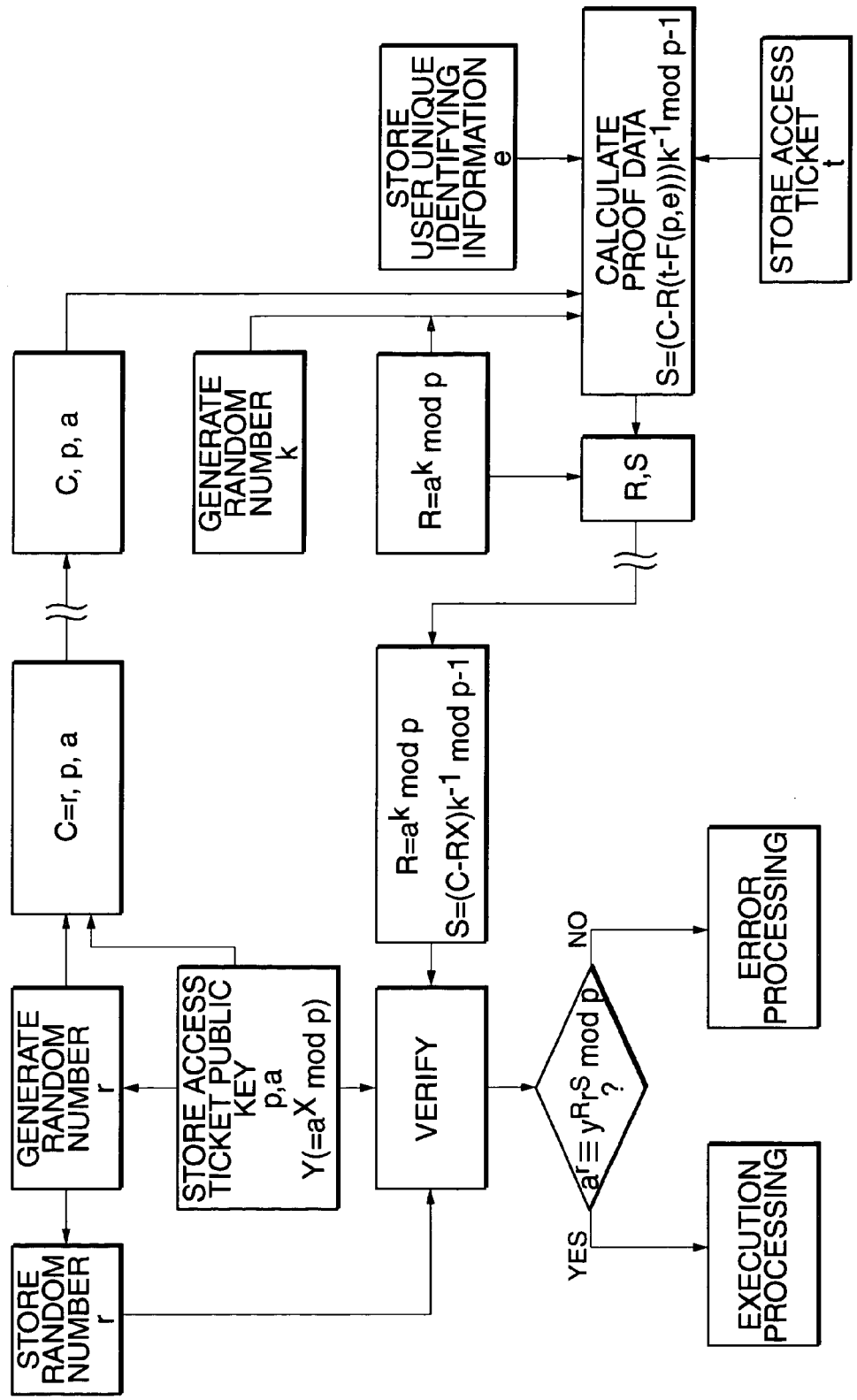
FIG. 26 is a flowchart explaining the operation, the authentication protocol, of the seventh embodiment.

Next, the seventh embodiment will further be explained with reference to FIG. 25 and FIG. 26. FIG. 25 illustrates the configuration of the seventh embodiment, and FIG. 26 illustrates the data flow in the seventh embodiment. In FIG. 25, a proof data verification device 60 includes an access ticket public key memory unit 601, a random number generation unit 602, a random number memory unit 603, a reception data memory unit 605, a verification unit 606, an execution unit 607, and an error processing unit 608. And, a proof data generation device 61 includes a reception data memory unit 611, a random number generation unit 612, a first calculation unit 613, a second calculation unit 614, an access ticket memory unit 615, and a user unique identifying information memory unit 616. Next, the operation will be explained.

1. The proof data verification device 60 is started by an access of a user.

2. The proof data verification device 60 writes the authentication data C, the modulus p stored in the access ticket public key memory unit 601, and the generator a into the reception data memory unit 611 of the proof data generation device 61. The authentication data C is generated in the following manner.

In the proof data verification device 60, the random number generation unit 602 generates the random number r to be prime to the modulus p held in the access ticket public key memory unit 601, and the random number r is written into the random number memory unit 603, and is treated as the authentication data C (C=r).

3. The random number generation unit 612 of the proof data generation device 61 generates a random number k that is prime to the modulus p−1.

The first calculation unit 613 calculates first proof data R with the random number k, and the modulus p and the generator a which are written into the reception data memory unit 611, based on the expression 59.

$$R = a^k \bmod p \tag{59}$$

The second calculation unit 614 calculates second proof data S, in accordance with the expression 60, with the access ticket t stored in the access ticket memory unit 615, the user unique identifying information e stored in the user unique identifying information memory unit 616, the random number k, the first proof data R, the authentication data C written into the reception data memory unit 611, and the modulus p.

$$S = (C - R(t - F(p, e))) k^{-1} \bmod p - 1 \tag{60}$$

4. The proof data generation device 61 answers the first proof data R and the second proof data S to the reception data memory unit 605 of the proof data verification device 60.

5. The verification unit 606 of the proof data verification device 60 fetches the random number r (=C) stored in the random number memory unit 603, the data Y and the modulus p which are stored in the access ticket public key memory unit 601, and verifies the proof data R and S in accordance with the expression 61.

$$a^r = Y^R R^S \bmod p \tag{61}$$

Eighth Embodiment

The eighth embodiment of the invention describes the method of generating the access ticket.

The generation of an access ticket in the first through the seventh embodiments requires the calculation based on the private key. Therefore, the generation of an access ticket needs to be executed in a secure carefree device that does not leak a private key for the calculation, or does not expose an intermediate result of the calculation.

The easiest way of configuring this type of secure device is to build a server that provides a user with an access ticket issuing service on a computer independent of a PC or work station used by the user. The server generates an access ticket in accordance with the user's request. The server must be configured so as to intercept invasion from the outside, whereby the calculation procedures of the private key and the access ticket are protected.

If an access ticket issuing server is configured, for example, with a computer set in a room that is locked, of which comings and goings are severely controlled, it will intercept attacks and invasion from the outside.

Also, in order to enhance user's profits and conveniences, it is possible to configure the system of issuing the access ticket such that the foregoing access ticket issuing server is connected to a network, the user's request for issuing an access ticket is received through the network, and a generated access ticket is delivered also through the network.

When the access ticket issuing server is connected to the network as mentioned above, the firewall technique (D. Brent Chapman & Elizabeth D. Zwicky, Building Internet Firewalls, O'Reilly & Associates, Inc.) is recommended for use, and the system requires to be built so as to sufficiently maintain the security against invasion and attacks from the outside through the network.

The access ticket in the first through seventh embodiments is generated in a form that any one except the legitimate user (who holds the user unique identifying information e used when the access ticket is calculated) cannot use.

The access ticket in the first through seventh embodiments is generated under a further severe security standard. In other words, even if a user who tries illegitimate access collects any number of access tickets (regardless of the tickets issued to the persons legitimate, or the tickets issued to others), it is impossible to falsify another access ticket therefrom, or to configure a device that imitates the operation of the proof data generation device described in the first through fifth embodiments.

Owing to the aforementioned security of the access ticket, it becomes possible that the access ticket issuing server delivers an access ticket to a user, utilizing a delivering technique having comparably low-level security such as an electronic mail.

Ninth Embodiment

This embodiment describes a method of configuring a user unique identifying information and an access ticket, which is different from those in the first through the seventh embodiments. The above method is characterized in that the access ticket can be generated without requiring a user's private information.

Accordingly, to generate an access ticket, the method does not require a securely organized access ticket issuing server against invasions from the outside, as described in the eighth embodiment. A user can generate the access ticket freely in accordance with a program that operates with the user's PC or work station. The program does not involve a secret constant or a secret procedure, and a program analysis will not derive any information that allows illegitimate access.

A unique information of a user U is a private key d of the RSA public key pair. The public key corresponding to the unique information of the user is assumed to be ($e_U$, $n_U$). With regard to different two large prime numbers $p_U$ and $q_U$, $n_U = p_U q_U$, $d_U$ and $e_U$ are integers determined to satisfy the expression 62.

$$1 \leq d_U \leq (p_U - 1)(q_U - 1)$$

$$1 \leq e_U \leq (p_U - 1)(q_U - 1)$$

$$e_U d_U \equiv 1 \bmod (p_U - 1)(q_U - 1) \tag{62}$$

Here, a condition is added that $n_U$ is larger than a constant N which is shared among all the users.

The access ticket to the user U is configured as follows.

A public key (E, n) of the RSA public key pair is assumed to be the public key of the access ticket, and a private key paired with the public key is given by D. Here, n<N. When the prime factor factorization is expressed by n=p q, the relational expression 63 is formulated.

$$1 \leq D \leq (p-1)(q-1)$$

$$DE \equiv 1 \bmod (p-1)(q-1) \tag{63}$$

An access ticket $t_U$ is defined by the expression 64.

$$t_U = D^{e_U} \bmod n_U \tag{64}$$

The unique security characteristic information in this embodiment is the private key D of the RSA public key pair.

In the same manner as in the first through seventh embodiments, it will be proved through the communication with the proof data verification device 10 that the proof data generation device 11 is capable of knowing the unique security characteristic information, namely, capable of calculating correct proof data in correspondence with given authentication data.

This embodiment is characterized in that the data acquired by encrypting the private key D being the unique security characteristic information is an access ticket, and the unique information of a user is the sole decryption key for decoding this encryption. Further, this embodiment is characterized in that any person in a position to know the corresponding public key is able to generate the access ticket, since the unique information of a user is served as the private key for the RSA public key cipher. Hereinafter, the operation of this embodiment will be described with reference to FIG. 27.

1. The proof data verification device 10 writes the authentication data C and the modulus n in a reception data memory unit 711 of the proof data generation device 10.

2. A decryption key generation unit 712 of the proof data generation device 11 acquires the user unique identifying information $d_U$ stored in a user unique identifying information memory unit 713 and the access ticket $t_U$ stored in an access ticket memory unit 715, and calculates the data D' by the expression 65.

$$D' = t_U^{d_U} \bmod n_U \tag{65}$$

3. The proof data generation unit 714 accepts the aforementioned private key D generated by the decryption key generation unit 712 and the authentication data C stored in the reception data memory unit 711, and calculates the expression 66 to acquire the data R. The proof data generation unit 14 returns the calculation result to the proof data verification device as answer data.

$$R = C^{D'} \bmod n \tag{66}$$

4. The proof data verification device verifies the correctness of the proof data R.

Since the private key D for the access ticket in the access ticket $t_U = D_{eU} \bmod n_U$ requires to be kept private to the user U, the user unique identifying information memory unit 713, the decryption key generation unit 712, and the proof data generation unit 714 are sealed in a protection section 760 having the tamper resistant characteristics.

In the same manner as in the first through seventh embodiments, the proof data R generated by the proof data generation device 11 is correctly verified by the proof data verification device 10, only when a correct combination of the first unique information and the access ticket of a user is used by the proof data generation device 11.

Tenth Embodiment

The tenth embodiment of the invention is substantially the same as the ninth embodiment, except that a symmetric key cipher is used instead of the public key cipher (RSA cipher) for calculating the proof data in the proof data generation device, and the access ticket is data acquired by encrypting the decryption key D (identical to the encryption key) for the symmetric key cipher with the public key ($e_U$, $n_U$) corresponding to the private key of the RSA public key pair being the user unique identifying information.

When the encryption function for the symmetric key cipher is expressed by Encrypt (key, clear text) (output, cipher text), and the decrypt function is expressed by Decrypt (key, cipher text) (output, clear text), the proof data C protected is defined by the expression 67.

$$C = \text{Encrypt}(D, K) \tag{67}$$

Further, the access ticket $t_U$ is defined by the expression 68.

$$t_U = D^{e_U} \bmod N_U \tag{68}$$

Figure 27:
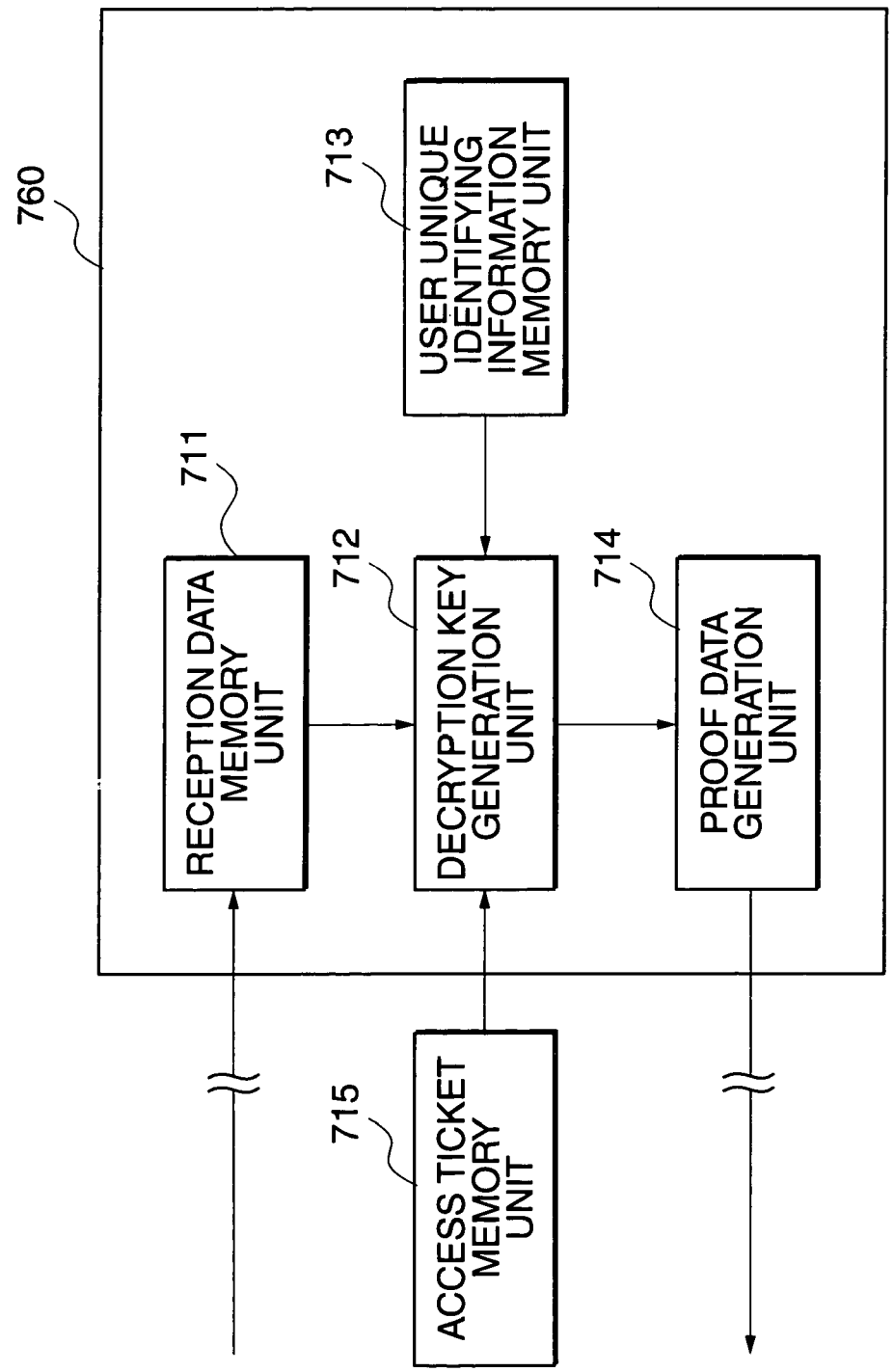
FIG. 27 is a block diagram explaining the authentication using an access ticket according to the ninth and tenth embodiments.

The configuration of the proof data generation device and the function thereof will be described with reference to FIG. 27.

1. The proof data verification device 10 writes the authentication data C into the reception data memory unit 711 of the proof data generation device 10.

2. The decryption key generation unit 712 of the proof data generation device 11 acquires the user unique identifying information $d_U$ stored in the user unique identifying information memory unit 713 and the access ticket $t_U$ stored in the access ticket memory unit 715, and calculates the data D' by the expression 69. The calculation result is outputted to the proof data generation unit 714.

$$D' = t_U^{d_U} \bmod n_U \tag{69}$$

3. The proof data generation unit 714 accepts the data D' generated by the decryption key generation unit 712 and the authentication data C stored in the reception data memory unit 711, and calculates the expression 70 to acquire the data R. The calculation result is sent back to the proof data verification device 10.

$$R = \text{Decrypt}(D', C) \tag{70}$$

4. The proof data verification device 11 verifies the data R, and decides whether to continue the normal processing or to execute the error processing.

As clearly explained above, when the foregoing embodiment is implemented with an intention of the access control (execution control) to the application programs that are executed on a user's PC or work station, the following effects can be derived.

1. A user needs to hold only one piece of user unique identifying information.

2. In a data storage device, protection processing is implemented by a method irrelevant to the user unique identifying information.

3. An access ticket is issued to a user who obtained an access permission to the data storage device. The user is permitted to access the data storage device, only when the user holds the user's own user unique identifying information and the access ticket.

4. The access ticket is securely generated in such a manner that, even if a user who does not hold a normal access ticket holds the ticket, it will not allow access to the data storage device.

Owing to these features, when hardware incorporating the user unique identifying information is distributed to users, the hardware is only needed to be distributed once to each user. Further, a person who protects the data storage device is only required to execute the protection processing of one data storage device in accordance with an ordinary method.

According to the foregoing embodiment, access to the data storage device requires an access ticket. However, since the access ticket is secure digital information that can be used only by the normal user, the access ticket can easily be delivered to the user through a network, etc.

Further, the access ticket is necessary to be replaced to each data storage device to be accessed. However, since it is digital information, the access ticket can easily be replaced by a program of the computer.

Figure 28:
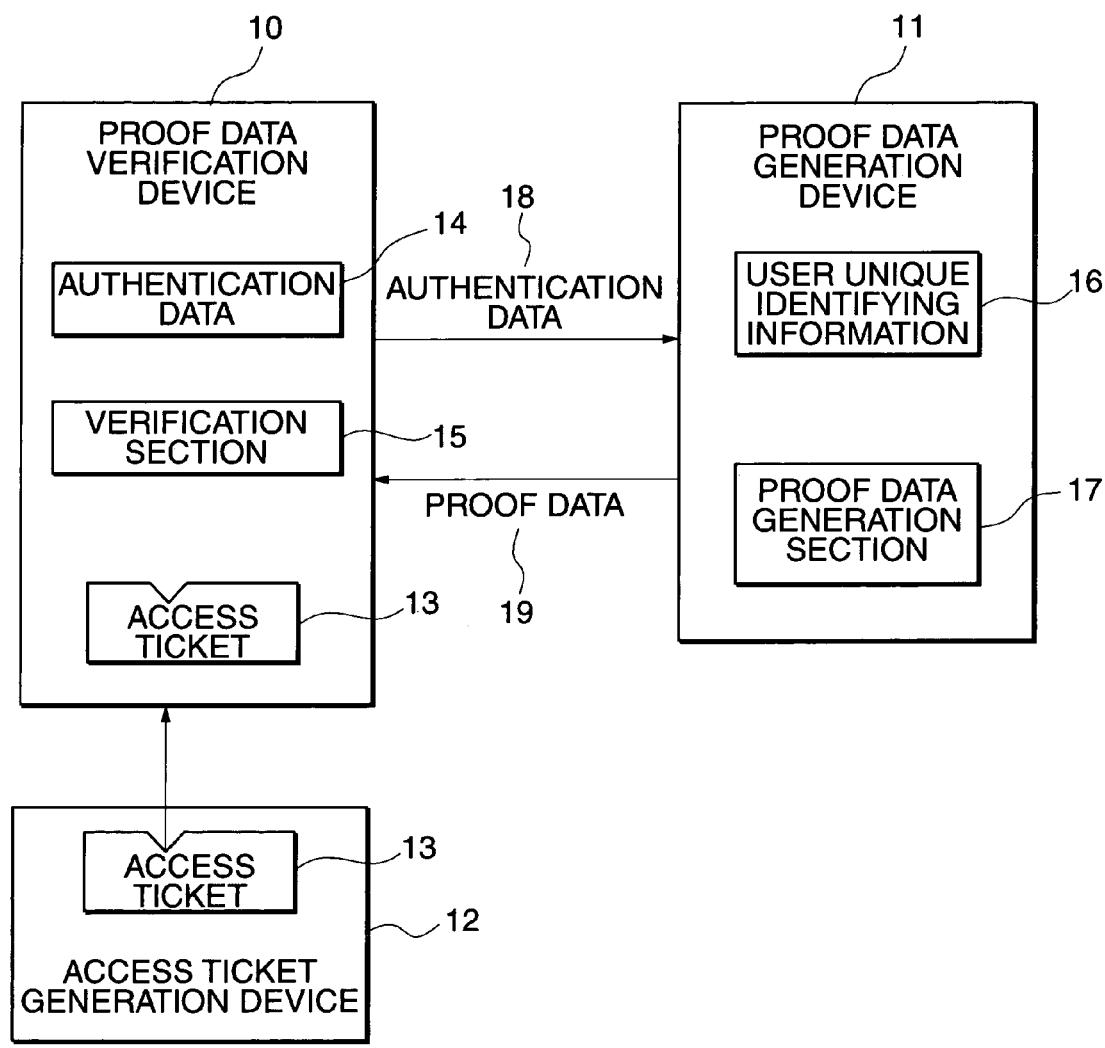
FIG. 28 is a block diagram explaining a modified example of the configuration in FIG. 3.

Further, the present invention is not limited to the aforementioned embodiments, and various changes and modifications are possible within the sprit and scope of the invention. For example, the aforementioned embodiments are configured to employ an auxiliary authentication information (access ticket) during generation of a proof data. However, the auxiliary authentication information may be designed to be used during verification. This configuration is illustrated in FIG. 28. Here in FIG. 28, the same symbols are given to the units corresponding to those in FIG. 3, and detailed explanations on them will be omitted.

Further, in the aforementioned embodiments, the access control to the data storage device is designed to authenticate a user's access right to applications. However, the access control to the data storage device may be configured to authenticate the user's access right to each application itself. This application may be a JAVA applet, for example, which is fetched from a server and executed. Also, it may be an application that an application server provides. If this configuration is made, the security will be achieved while the application management is performed.

Further, in the aforementioned embodiments, the data storage device is assumed to include a write once storage medium. However, it may include an ordinary rewritable storage medium as well as the write once. In this case, data is recorded in the rewritable storage medium, except for specific data such as an access log and data necessary for detecting tampering. Incidentally, the write once storage medium is not used as the backup but used as the auxiliary storage device in the same manner as the general hard disk drive.

Further, even in case where the function for authenticating user's access right is not used, the data except for the specific data such as an access log is recorded in the rewritable storage medium, and the specific data is recorded in the write once storage medium; and thereby, the data storage device is able to cope with tampering, etc., and to effectively use the storage medium by rewriting.

As described above, according to the invention, when a user accesses a file with an application program stored in the data storage device, the access right of the user to the application program is authenticated by the data storage device provided with the function for authenticating user's access right, and the user is permitted to access the file in the data storage device only when the user possesses the correct access right thereto.

Further, by introducing the auxiliary proof data (access ticket), the unique security characteristic information and the user unique identifying information of the application program can be brought into an independent relation. Therefore, both the data storage device side provided with the function for authenticating user's access right and the user side for the application program are only needed to have one piece of characteristic information and user unique identifying information installed. The access ticket is data calculated in accordance with the user unique identifying information of a specific application program and the unique security characteristic information, and without knowing the user unique identifying information of the application program, it is impossible to calculate the unique security characteristic information from the access ticket at least in view of calculation quantity. Correct proof data is calculated, only when a correct combination of the user unique identifying information of an application program and the access ticket, namely, the combination of the user unique identifying information of an application program and the access ticket calculated in accordance with the user unique identifying information of the application program is inputted. Therefore, the application program retains in advance the user unique identifying information of the application program; and the data storage device provided with the function for authenticating user's access right provides for the unique security characteristic information independent of the user unique identifying information of the application program that the application program holds, creates an access ticket in accordance with the user unique identifying information of the application program and the unique security characteristic information, and distributes it, thereby authenticating the user's access right to the application program including the execution control.

Further, the attacks for destruction and tampering by illegal access having passed through the first stage and illegal access from the enemy within the gate can be prevented by using a write once optical storage medium for at least a part of the storage medium.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data storage device provided with a function for authenticating a user's access right, which verifies legitimacy of proof data generated for proving a right of an application program to access data stored in a storage medium, to thereby authenticate the access right of a user of the application program to the data, the data storage device comprising:

first storage means for storing authentication data;

second storage means for storing user unique identifying information of the user of the application program;

third storage means for storing auxiliary proof information being a result in which a specific calculation is executed to the user unique identifying information of the application program and unique security characteristic information;

proof data generation means for executing a specific calculation to the authentication data stored in the first storage means, the user unique identifying information of the application program stored in the second storage means, and the auxiliary proof information stored in the third storage means, to thereby generate proof data;

a data storage main frame provided with the storage medium, which stores and preserves data in the storage medium;

command generation means installed in the application program, for generating a command that instructs an operation to the data stored in the storage medium of the data storage main frame;

command issuing means installed in the application program, for issuing the command generated by the command generation means to the outside of the application program;

proof data verification means for verifying that the proof data generated by the proof data generation means has been generated on the basis of the unique security characteristic information; and command management means for permitting to execute the command only when the verification is successful, as to at least one type of the command that instructs the operation to the data stored in the data storage main frame;

wherein:

the command is erasing the data stored within the storage medium; and in spite of any erasing command issued, the data stored within the storage medium is preserved.

2. A data storage device provided with a function for authenticating a user's access right according to claim 1, wherein at least the second storage means and the proof data generation means are retained in protection means for making it difficult to observe the inner data and processing procedures from the outside.

3. A data storage device provided with a function for authenticating a user's access right according to claim 1, wherein at least the second storage means and the proof data generation means are configured in a small portable processor.

4. A data storage device provided with a function for authenticating a user's access right according to claim 1, wherein the proof data generation means includes first calculation means and second calculation means, in which the first calculation means executes a specific calculation to the user unique identifying information of the application program stored in the second storage means and the auxiliary proof information stored in the third storage means to produce the unique security characteristic information as a result of the calculation, and the second calculation means executes a specific calculation to the authentication data stored in the first storage means and the unique security characteristic information calculated by the first calculation means to generate the proof data as a result of the calculation.

5. A data storage device provided with a function for authenticating a user's access right according to claim 4, wherein the user unique identifying information of the application program is a decryption key of an encryption function, the auxiliary proof information is the unique security characteristic information encrypted by an encryption key corresponding to the decryption key, and the first calculation means decrypts the auxiliary proof information by using the decryption key being the user unique identifying information of the application program to thereby calculate the unique security characteristic information.

6. A data storage device provided with a function for authenticating a user's access right according to claim 5, wherein the encryption function is an asymmetric key encryption function, and the user unique identifying information of the application program is a key on one side.

7. A data storage device provided with a function for authenticating a user's access right according to claim 6, wherein the encryption function is a public key encryption function, and the user unique identifying information of the application program is a private key.

8. A data storage device provided with a function for authenticating a user's access right according to claim 5, wherein the encryption function is a symmetric key encryption function, and the user unique identifying information of the application program is a common secret key.

9. A data storage device provided with a function for authenticating a user's access right according to claim 1, wherein the proof data generation means includes third calculation means, fourth calculation means, and fifth calculation means, in which the third calculation means executes a specific calculation to the authentication data stored in the first storage means and the auxiliary proof information stored in the third storage means, the fourth calculation means executes a specific calculation to the authentication data stored in the first storage means and the user unique identifying information of the application program stored in the second storage means, and the fifth calculation means executes a specific calculation to a calculation result by the third calculation means and a calculation result by the fourth calculation means, to generate the proof data as a result of the calculation.

10. A data storage device provided with a function for authenticating a user's access right according to claim 9, wherein at least the second storage means and the fourth calculation means are retained in protection means for making it difficult to observe the inner data and processing procedures from the outside.

11. A data storage device provided with a function for authenticating a user's access right according to claim 9, wherein at least the second storage means and the fourth calculation means are configured in a small portable processor.

12. A data storage device provided with a function for authenticating a user's access right according to claim 1, wherein the unique security characteristic information is a decryption key in an encryption function, the authentication data is appropriate data encrypted by using an encryption key corresponding to the decryption key, and the proof data verification means verifies that the proof data generated by the proof data generation means is identical to the correct decryption of the authentication data.

13. A data storage device provided with a function for authenticating a user's access right according to claim 12, wherein the encryption function is an asymmetric encryption function, and the unique security characteristic information is a key on one side.

14. A data storage device provided with a function for authenticating a user's access right according to claim 13, wherein the encryption function is a public key encryption function, and the unique security characteristic information is a private key.

15. A data storage device provided with a function for authenticating a user's access right according to claim 12, wherein the encryption function is a symmetric encryption function, and the unique security characteristic information is a common secret key.

16. A data storage device provided with a function for authenticating a user's access right according to claim 12, wherein the proof data verification means includes eighth storage means for storing clear text data corresponding to the authentication data or the seed for authentication data being encrypted data and comparison means, and the comparison means compares the proof data generated by the proof data generation means or a result having the random number effect removed from the proof data with the clear text data stored in the eighth storage means, and only when both are identical, judges the proof data to be legitimate.

17. A data storage device provided with a function for authenticating a user's access right according to claim 12, wherein the proof data verification means includes ninth storage means for storing a result having a specific one-way function applied to clear text data corresponding to the authentication data or the seed for authentication data being encrypted data, sixth calculation means, and comparison means, the sixth calculation means applies the one-way function to the proof data generated by the proof data generation means after derandomizing if necessary, and the comparison means compares a calculation result by the sixth calculation means with data stored in the ninth storage means, and only when both are identical, judges the proof data to be legitimate.

18. A data storage device provided with a function for authenticating a user's access right according to claim 12, wherein the proof data verification means includes program execution means, the authentication data or the seed for authentication data is data obtained by encrypting a program, the proof data verification means passes, after derandomizing if necessary, the proof data generated by the proof data generation means to the program execution means as a program, whereby the program execution means executes a correct operation, when the proof data generation means correctly decrypts the authentication data or the seed for authentication data being an encrypted program, namely, only when the encrypted program is correctly decrypted.

19. A data storage device provided with a function for authenticating a user's access right according to claim 12, wherein the proof data verification means includes program execution means, program storage means, and program decryption means, a program stored in the program storage means is encrypted to a part or whole thereof, the authentication data or the seed for authentication data is data obtained by separately encrypting a decryption key for decrypting the encrypted program, the proof data verification means passes the proof data generated by the proof data generation means to the program decryption means, the program decryption means uses, after derandomizing if necessary, the proof data generated by the proof data generation means as a decryption key to thereby decrypt a necessary part of the program stored in the program storage means, the program execution means executes the decrypted program, whereby, when the proof data generation means correctly decrypts the authentication data or the seed for authentication data, namely, only when the decryption key for decrypting the encrypted program is correctly decrypted, the program execution means executes a correct operation.

20. A data storage device provided with a function for authenticating a user's access right according to claim 1, wherein the unique security characteristic information is an encryption key in an encryption function, and the proof data generated by the proof data generation means is verified to be the authentication data correctly encrypted by using the encryption key.

21. A data storage device provided with a function for authenticating a user's access right according to claim 1, wherein the unique security characteristic information is a signature key in a digital signature function, and the proof data generated by the proof data generation means is verified to be a digital signature to the authentication data generated by using the signature key.

22. A data storage device provided with a function for authenticating a user's access right according to claim 1, through mutual communication between the proof data generation device including the first storage means, the second storage means, the third storage means, and the proof data generation means, and the proof data verification device including, in addition to the proof data verification means, fourth storage means for storing the authentication data and fifth storage means for storing the proof data, wherein the proof data verification device writes the authentication data stored in the fourth storage means into the first storage means of the proof data generation device, the proof data generation device writes the proof data generated on the basis of the authentication data written into the first storage means by the proof data generation means into the fifth storage means of the proof data verification device, and the proof data verification device authenticates the user's access right by using the proof data written into the fifth storage means.

23. A data storage device provided with a function for authenticating a user's access right according to claim 22, wherein the unique security characteristic information is an encryption key in an encryption function, the proof data verification device includes random number generation means, the random number generation means writes a random generated number into the fourth storage means as the authentication data, and the proof data verification means verifies the proof data written into the fifth storage means by the proof data generation device to be the encryption of the random number being the authentication data using encryption key being the unique security characteristic information.

24. A data storage device provided with a function for authenticating a user's access right according to claim 23, wherein the encryption function is of the RSA public key crypto-system using a modulus n, the unique security characteristic information is a private key D, a public key corresponding to the private key D is E, and the proof data verification means verifies E power of proof data R written into the fifth storage means to be congruent with an authentication data C stored in the fourth storage means, modulo n ($R^E$ mod n=C mod n).

25. A data storage device provided with a function for authenticating a user's access right according to claim 24, wherein the encryption function is of the RSA public key crypto-system using a modulus n, the unique security characteristic information is the private key D, the public key corresponding to the private key D is E, auxiliary proof information t stored in the third storage means is data obtained by subtracting user unique identifying information e of the application program stored in the second storage means from the private key D, and adding a product of a value of a non-collision function $\omega(=G(n, e))$ dependent on the modulus n and the user unique identifying information e, and an Eulerian number $\phi(n)$ ($t=D-e+\omega\phi(n)$), and the proof data generation means generates the proof data by calculating D power of C modulo n ($C^D$ mod n), from the t, the e, and the authentication data C stored in the first storage means.

26. A data storage device provided with a function for authenticating a user's access right according to claim 25, wherein the proof data generation means includes third calculation means, fourth calculation means, and fifth calculation means, the third calculation means calculates the t power of the C modulo n ($C^t$ mod n), the fourth calculation means calculates the e power of the C modulo n ($C^e$ mod n), and the fifth calculation means multiplies a result of the calculation by the first calculation means by that of the calculation by the second calculation means modulo n to thereby generate the proof data R ($=C^tC^e$ mod n).

27. A data storage device provided with a function for authenticating a user's access right according to claim 26, wherein the second storage means and the fourth calculation means are built in protection means for protecting the inner processing procedures and data from outside observation.

28. A data storage device provided with a function for authenticating a user's access right according to claim 24, wherein the encryption function is of the RSA public key crypto-system using a modulus n, the unique security characteristic information is the private key D, the public key corresponding to the private key D is E, auxiliary proof information t stored in the third storage means is data obtained by adding to the D a value of a non-collision function F(n, e) which is dependent on the modulus n and user unique identifying information e of the application program stored in the second storage means (t=D+F(n, e)), and the proof data generation means generates the proof data by calculating D power of C modulo n ($C^D$ mod n), from the t, the e, and the authentication data C stored in the first storage means.

29. A data storage device provided with a function for authenticating a user's access right according to claim 28, wherein the proof data generation means includes third calculation means, fourth calculation means, and fifth calculation means, the third calculation means calculates the t power of the C modulo n ($C^t$ mod n), the fourth calculation means calculates the F(n, e) power of the C modulo n ($C^{F(n, e)}$ mode n, and the fifth calculation means multiplies a result of the calculation by the third calculation means by the reverse of a calculation result by the fourth calculation means modulo n to thereby generate the proof data R ($=C^tC^{-F(n, e)}$mod n).

30. A data storage device provided with a function for authenticating a user's access right according to claim 29, wherein the second storage means and the fourth calculation means are built in protection means for protecting the inner processing procedures and data from outside observation.

31. A data storage device provided with a function for authenticating a user's access right according to claim 23, wherein the encryption function is of the Pohlig-Hellman asymmetric crypto-system using a modulus p, the unique security characteristic information is a key D on one side, a key on the other side corresponding to the key D is E (DE mod p−1=1), and the proof data verification means verifies E power of proof data R written into the fifth storage means to be congruent with authentication data C stored in the fourth storage means, modulo p ($R^E$ mod p=C mod p).

32. A data storage device provided with a function for authenticating a user's access right according to claim 31, wherein the encryption function is of the Pohlig-Hellman asymmetric crypto-system using a modulus p, the unique security characteristic information is a key D on one side, a key on the other side corresponding to the key D is E (DE mod p−1=1), auxiliary proof information t stored in the third storage means is data obtained by adding to the D a value of a non-collision function F(p, e) which is dependent on the modulus p and user unique identifying information e of the application program stored in the second storage means (t=D+F(p, e)), and the proof data generation means generates the proof data by calculating D power of C modulo p ($C^D$ mod p), from the t, the e, and the authentication data C stored in the first storage means.

33. A data storage device provided with a function for authenticating a user's access right according to claim 32, wherein the proof data generation means includes third calculation means, fourth calculation means, and fifth calculation means, the third calculation means calculates the t power of the C modulo p ($C^t$ mod p), the fourth calculation means calculates the F(p, e) power of the C modulo p ($C^{F(p, e)}$ mod p), and the fifth calculation means multiplies a result of the calculation by the third calculation means by the reverse of a calculation result by the fourth calculation means modulo p to thereby generate the proof data R (=$C^t C^{-F(p, e)}$ mod p).

34. A data storage device provided with a function for authenticating a user's access right according to claim 33, wherein the second storage means and the fourth calculation means are built in protection means for protecting the inner calculation procedures and data from outside observation.

35. A data storage device provided with a function for authenticating a user's access right according to claim 22, wherein the unique security characteristic information is a decryption key in an encryption function, the proof data verification device includes random number generation means, sixth storage means for storing a generated random number, and seventh storage means for storing a seed for authentication data, the random number generation means writes a generated random number into the sixth storage means, randomizes the seed for authentication data stored in the seventh storage means by using the random number, and thereafter writes the result of the randomization as the authentication data into the fourth storage means, and the proof data verification means verifies the result with the random number effect by the random number stored in the sixth storage means removed from the proof data written into the fifth storage means to be identical to the decryption of the seed for authentication data stored in the seventh storage means by the decryption key being the unique security characteristic information.

36. A data storage device provided with a function for authenticating a user's access right according to claim 35, wherein the encryption function is of the RSA public key crypto-system using a modulus n, the unique security characteristic information is a private key D, a public key corresponding to the private key D is E, the seed for authentication data stored in the seventh storage means is a number K' being E power of a data K modulo n (K'=$K^E$ mod n), the random number generation means writes a number C being E power of a random number r modulo n multiplied by the number K' modulo n (C=$r^E$K' mod n) into the fourth storage means as the authentication data, and the proof data verification means verifies a reverse modulo n of the random number r stored in the sixth storage means multiplied by proof data R written into the fifth storage means to be congruent with the data K modulo n (K mod n=$r^{-1}$R mod n).

37. A data storage device provided with a function for authenticating a user's access right according to claim 35, wherein the encryption function is of the Pohlig-Hellman asymmetric crypto-system using a modulus p, the unique security characteristic information is a key D on one side, a key on the other side corresponding to the key D is E (DE mod p−1=1), the seed for authentication data stored in the seventh storage means is a number K' being E power of a data K modulo p (K'=$K^E$ mod p), the random number generation means writes a number C that is identical to E power of a random number r modulo p multiplied by the number K' modulo p (C=$r^E$K' mod p) into the fourth storage means as the authentication data, and the proof data verification means verifies a reverse modulo p of the random number r stored in the sixth storage means multiplied by the proof data R written into the fifth storage means to be congruent with the data K modulo p (K mod p=$R^{-1}$R mod p).

38. A data storage device provided with a function for authenticating a user's access right according to claim 35, wherein, when the encryption function is of the ElGamal public key crypto-system using a modulus p of the ElGamal public key crypto-system using a modulus p and a generator a, the unique security characteristic information is a private key X, a public key corresponding to the key X is Y (Y=$a^X$ mod p), u is a number that the a is exponentiated by an appropriate random number z as an exponent modulo p (u=$a^z$ mod p), and K' is a product of data K and the Y exponentiated by the random number z modulo p (K'=$Y^Z$K mod p), a combination of the u and the K' is stored in the seventh storage means as the seed for authentication data, the random number generation means writes the u and a number C that results from a random number r multiplied by the number K' modulo p (C=rK' mod p) into the fourth storage means as the authentication data, and the proof data verification means verifies a reverse modulo p of the random number r stored in the sixth storage means multiplied by proof data R written into the fifth storage means to be congruent with the data K modulo p (K mod p=$r^{-1}$R mod p).

39. A data storage device provided with a function for authenticating a user's access right according to claim 38, wherein, when the encryption function is of the ElGamal public key crypto-system using a modulus p and a generator a, the unique security characteristic information is a key X on one side, a public key corresponding to the key X is Y (Y=$a^X$ mod p), auxiliary proof information t stored in the third storage means is data obtained by adding to the X a value of a non-collision function F(p, e) which is dependent on the modulus p and user unique identifying information e of the application program stored in the second storage means (t=X+F(p, e)), and the proof data generation means generates the proof data by calculating C divided by X power of the u modulo p ($Cu^{-X}$ mod p), from the t, the e, and the authentication data u and C stored in the first storage means.

40. A data storage device provided with a function for authenticating a user's access right according to claim 39, wherein the proof data generation means includes third calculation means, fourth calculation means, and fifth calculation means, the third calculation means calculates the t power of the u modulo p ($u^t$ mod p), the fourth calculation means calculates the F(p, e) power of the u modulo p ($u^{F(p, e)}$ mod p), and the fifth calculation means divides the C by a calculation result of the third calculation means modulo p and multiplies a calculation result of the fourth calculation means to thereby generate the proof data R ($=Cu^{-t}u^{F(p, e)}$ mod p).

41. A data storage device provided with a function for authenticating a user's access right according to claim 40, wherein the second storage means and the fourth calculation means are built in protection means for protecting the inner calculation procedures and data from outside observation.

42. A data storage device provided with a function for authenticating a user's access right according to claim 22, wherein the unique security characteristic information is a signature key in a digital signature function, the proof data verification device includes random number generation means, the random number generation means writes a generated random number into the fourth storage means as the authentication data, and the proof data verification means verifies the proof data written into the fifth storage means by the proof data generation device to be a digital signature to the authentication data being the random number by the signature key being the unique security characteristic information.

43. A data storage device provided with a function for authenticating a user's access right according to claim 42, wherein the digital signature function is of the ElGamal sgnature scheme using the modulus p and a generator a, the unique security characteristic information is a signature key X, a public key corresponding to the key X is Y ($Y=a^X$ mod p), and the proof data verification means verifies, in regard to a proof data R and S, a value being the a exponentiated by authentication data C as an exponent stored in the fourth storage means, modulo p to be congruent with a product of the R power of the Y and the S power of the R, modulo p ($a^C$ mod p=$Y^R R^S$ mod p).

44. A data storage device provided with a function for authenticating a user's access right according to claim 43, wherein the digital signature function is the E 1 Gamal signature under the modulus p and a generator a, the unique security characteristic information is the signature key X, the public key corresponding to the key X is Y ($Y=a^X$ mod p), auxiliary proof information t stored in the third storage means is data obtained by adding to the X a value of a non-collision function F(p, e) which is dependent on the modulus p and a user unique identifying information e of the application program stored in the second storage means (t=X+F(p, e)), and the proof data generation means generates an appropriate random number k in generating the proof data R and S, adopts the k power of the a modulo p as the R ($=a^k$ mod p), subtracts a product of the X and the R from the C modulo p−1 and multiplies the calculation result with a reverse of the k, from the t, the e, and the authentication data C written into the first storage means, and thereby calculates the S ($=(C-RX)k^{-1}$ mod p−1).

45. A data storage device provided with a function for authenticating a user's access right according to claim 44, wherein the second storage means and the proof data generation means are built in protection means for protecting the inner calculation procedures and data from outside observation.

46. A data storage device provided with a function for authenticating a user's access right according to claim 22, wherein the proof data generation device and the proof data verification device are installed in one enclosure, and the proof data generation device and the proof data verification device communicate with each other without using a communication medium outside the enclosure.

47. A data storage device provided with a function for authenticating a user's access right according to claim 1, wherein the storage medium of the data storage device is a write once optical storage medium.

48. A data storage device provided with a function for authenticating a user's access right according to claim 47, wherein the write once optical storage medium of the data storage device is a phase change type optical storage medium.

49. A data storage device provided with a function for authenticating a user's access right according to claim 47, wherein the write once optical storage medium of the data storage device is a phase separation type optical storage medium.

50. A data storage device provided with a function for authenticating a user's access right according to claim 1, wherein the storage medium that first stores at least a specific access log, of the storage medium of the data storage device, is a write once optical storage medium.

51. A data storage device provided with a function for authenticating a user's access right, which verifies legitimacy of proof data generated for proving right of an application program to access data, stored in a storage medium, to thereby authenticate the access right of a user of the application program to the data, the data storage device comprising:

first storage means for storing authentication data;

second storage means for storing user unique identifying information of the application program;

third storage means for storing auxiliary proof information being a result in which a specific calculation is executed to the user unique identifying information of the application program and unique security characteristic information;

proof data generation means for executing a specific calculation to the authentication data stored in the first means and the user unique identifying information of the application program stored in the second storage means, to thereby generate proof data;

a data storage main frame provided with a storage medium, which stores and preserves data in the storage medium;

command generation means installed in the application program, for generating a command that instructs an operation to the data stored in the storage medium of the data storage main frame;

command issuing means installed in the application program, for issuing a command generated by the command generation means to the outside of the application program;

proof data verification means including calculation means for applying a specific calculation to the proof data generated by the proof data generation means and the auxiliary proof information held in the third storage means, which verifies the proof data to be generated on the basis of the user unique identifying information of the application program, by using a calculation result by the calculation means; and command management means for permitting to execute the command only when the verification is successful, as to at least one type of the command that instructs the operation to the data stored in the data storage main frame;

wherein:

the command is erasing the data stored within the storage medium; and in spite of any erasing command issued, the data within the storage medium is preserved.

* * * * *